United States Patent
Baba

(10) Patent No.: US 10,268,936 B2
(45) Date of Patent: Apr. 23, 2019

(54) INFORMATION PROCESSING APPARATUS INCLUDING NEAR-FIELD WIRELESS COMMUNICATION TAG, METHOD OF CONTROLLING THE SAME, AND STORAGE MEDIUM

(71) Applicant: CANON KABUSHIKI KAISHA, Tokyo (JP)

(72) Inventor: Tatsuru Baba, Beppu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 94 days.

(21) Appl. No.: 15/078,210

(22) Filed: Mar. 23, 2016

(65) Prior Publication Data

US 2016/0291912 A1    Oct. 6, 2016

(30) Foreign Application Priority Data

Mar. 30, 2015    (JP) ................. 2015-068492

(51) Int. Cl.
*G06K 15/00*    (2006.01)
*H04W 4/80*    (2018.01)
*H04B 5/00*    (2006.01)

(52) U.S. Cl.
CPC .......... *G06K 15/4045* (2013.01); *H04W 4/80* (2018.02); *H04B 5/0056* (2013.01)

(58) Field of Classification Search
CPC . G06K 15/4045; H04W 4/008; H04B 5/0056; H04N 2201/0077; H04N 2201/0094; H04N 100/127; H04N 1/00307; H04N 2201/0008; H04N 2201/006

USPC ............................................. 358/1.15
See application file for complete search history.

(56) References Cited

U.S. PATENT DOCUMENTS

| 2013/0215467 A1* | 8/2013 | Fein ................. G06F 3/1204 358/1.15 |
| 2014/0176991 A1* | 6/2014 | Yun ................. H04W 64/00 358/1.15 |
| 2014/0303783 A1* | 10/2014 | Ha ................. D06F 39/005 700/275 |
| 2015/0312702 A1* | 10/2015 | Raju ................. H04W 4/008 455/41.1 |
| 2016/0057298 A1* | 2/2016 | Sasase ............... H04N 1/00392 358/1.15 |

FOREIGN PATENT DOCUMENTS

JP    2012068748 A    4/2012

* cited by examiner

*Primary Examiner* — Kent Yip
(74) *Attorney, Agent, or Firm* — Rossi, Kimms & McDowell LLP

(57) ABSTRACT

An information processing apparatus capable of configuring interrupt settings of a NFC tag by taking into account the direction of data transfer. An information processing apparatus includes an NFC tag. A user selects either a first function in which a mobile terminal writes data into the NFC tag or a second function in which the terminal reads data held by the NFC tag. The NFC tag is set to one of a first interrupt setting for generating an interrupt signal when data is written into the NFC tag by the terminal, and a second interrupt setting for generating an interrupt signal when data held by the NFC tag is read by the terminal. When the first function is selected, the NFC tag is set to the first interrupt setting, and when the second function is selected, the NFC tag is set to the second interrupt setting.

10 Claims, 16 Drawing Sheets

INFORMATION PROCESSING APPARATUS INCLUDING NEAR-FIELD WIRELESS COMMUNICATION TAG, METHOD OF CONTROLLING THE SAME, AND STORAGE MEDIUM

BACKGROUND OF THE INVENTION

Field of the Invention

The present invention relates to near-field wireless communication tag control performed by an information processing apparatus including a near-field wireless communication tag.

Description of the Related Art

In recent years, there have been developed apparatuses each having a plurality of wireless communication means (methods). Further, there has been proposed a technique for transmitting and receiving information for connecting higher-speed wireless communication means, using lower-speed wireless communication means, between such apparatuses, and then changing the wireless communication means to the higher-speed wireless communication means (see Japanese Patent Laid-Open Publication No. 2012-68748). In general, RFID (Radio Frequency Identification) or NFC (Near Field Communication) is used as the lower-speed communication means. Further, Bluetooth™ or a wireless LAN (Local Area network) is often used as the higher-speed communication means.

Communication methods, such as RFID and NFC, are applied mainly between a reader/writer and a module called a "near-field wireless communication tag". The reader/writer is configured to read data from and write data into the tag by transmitting radio waves. The tag is configured to perform communication using the radio waves transmitted from the reader/writer. Further, the tags include one having only wireless communication means as the communication means, and one also having other communication means independent of the wireless communication means. In general, the communication means included in the tag, which is independent of the wireless communication means, is implemented using wire, and is used for communication with a main controller of an apparatus equipped with the tag. The tag is generally capable of autonomously performing wireless communication. To this end, the tag is provided with a mechanism for generating an interrupt signal, and an apparatus equipped with the tag is provided with a mechanism for detecting completion of wireless communication of the tag, based on the interrupt signal generated by the tag. The tag has a function for sending a response to a request from the reader/writer. Therefore, the interrupt signals generated by the tag include one for notifying the apparatus equipped with the tag of detection of the radio waves transmitted from the reader/writer, and one for notifying the apparatus that a response to a request from the reader/writer has been normally made.

However, to allow the reader/writer of an external apparatus to read data from or write data into the tag, some of the apparatuses equipped with the tag are required to select the type of an interrupt signal generated by the tag. For this reason, there is a demand for a mechanism which sets the type of an interrupt signal to be generated, for the tag, by taking into account the direction of data transfer performed by the tag via the wireless communication means.

SUMMARY OF THE INVENTION

The present invention provides an information processing apparatus that is capable of configuring interrupt settings of a near-field wireless communication tag by taking into account the direction of data transfer, a method of controlling the same, and a storage medium.

In a first aspect of the present invention, there is provided an information processing apparatus including a near-field wireless communication tag, comprising a selection unit configured to select, based on a user's instruction, one of a first function in which an external apparatus writes data into the near-field wireless communication tag and a second function in which the external apparatus reads data held by the near-field wireless communication tag, as a function making use of the near-field wireless communication tag, and a setting unit configured to set the near-field wireless communication tag to one of a first interrupt setting, which is a setting of causing an interrupt signal to be generated when data is written into the near-field wireless communication tag by the external apparatus, and a second interrupt setting, which is a setting of causing an interrupt signal to be generated when data held by the near-field wireless communication tag is read by the external apparatus, wherein in a case where the first function is selected by the selection unit, the setting unit sets the near-field wireless communication tag to the first interrupt setting, and wherein in a case where the second function is selected by the selection unit, the setting unit sets the near-field wireless communication tag to the second interrupt setting.

In a second aspect of the present invention, there is provided a method of controlling an information processing apparatus including a near-field wireless communication tag, comprising selecting, based on a user's instruction, one of a first function in which an external apparatus writes data into the near-field wireless communication tag and a second function in which the external apparatus reads data held by the near-field wireless communication tag, as a function making use of the near-field wireless communication tag, and setting the near-field wireless communication tag to one of a first interrupt setting, which is a setting of causing an interrupt signal to be generated when data is written into the near-field wireless communication tag by the external apparatus, and a second interrupt setting, which is a setting of causing an interrupt signal to be generated when data held by the near-field wireless communication tag is read by the external apparatus, wherein said setting includes, in a case where the first function is selected by said selecting, setting the near-field wireless communication tag to the first interrupt setting, and in a case where the second function is selected by said selecting, setting the near-field wireless communication tag to the second interrupt setting.

In a third aspect of the present invention, there is provided a non-transitory computer-readable storage medium storing a computer-executable program for executing a method of controlling an information processing apparatus including a near-field wireless communication tag, wherein the method comprises selecting, based on a user's instruction, one of a first function in which an external apparatus writes data into the near-field wireless communication tag and a second function in which the external apparatus reads data held by the near-field wireless communication tag, as a function making use of the near-field wireless communication tag, and setting the near-field wireless communication tag to one of a first interrupt setting, which is a setting of causing an interrupt signal to be generated when data is written into the near-field wireless communication tag by the external apparatus, and a second interrupt setting, which is a setting of causing an interrupt signal to be generated when data held by the near-field wireless communication tag is read by the external apparatus, wherein said setting includes, in a case where the first function is selected by said selecting, setting the near-field wireless communication tag to the first interrupt setting, and in a case where the second function is selected by said selecting, setting the near-field wireless communication tag to the second interrupt setting.

According to the present invention, it is possible to configure interrupt settings of a near-field wireless communication tag by taking into account the direction of data transfer.

Further features of the present invention will become apparent from the following description of exemplary embodiments (with reference to the attached drawings).

BRIEF DESCRIPTION OF THE DRAWINGS

FIGS. 10A to 10C are diagrams each showing a user interface screen displayed on the console section of the image forming apparatus, in which FIG. 10A shows a setting/registration menu screen, FIG. 10B shows a pairing setting confirmation window, and FIG. 10C shows an address book transmission setting confirmation window.

FIGS. 13A and 13B are diagrams each showing a user interface screen displayed on a console section of an image forming apparatus as an information processing apparatus according to a third embodiment of the present invention, in which FIG. 13A shows a setting/registration menu screen, and FIG. 13B shows a one-touch communication setting confirmation window.

DESCRIPTION OF THE EMBODIMENTS

The present invention will now be described in detail below with reference to the accompanying drawings showing embodiments thereof.

Figure 1:
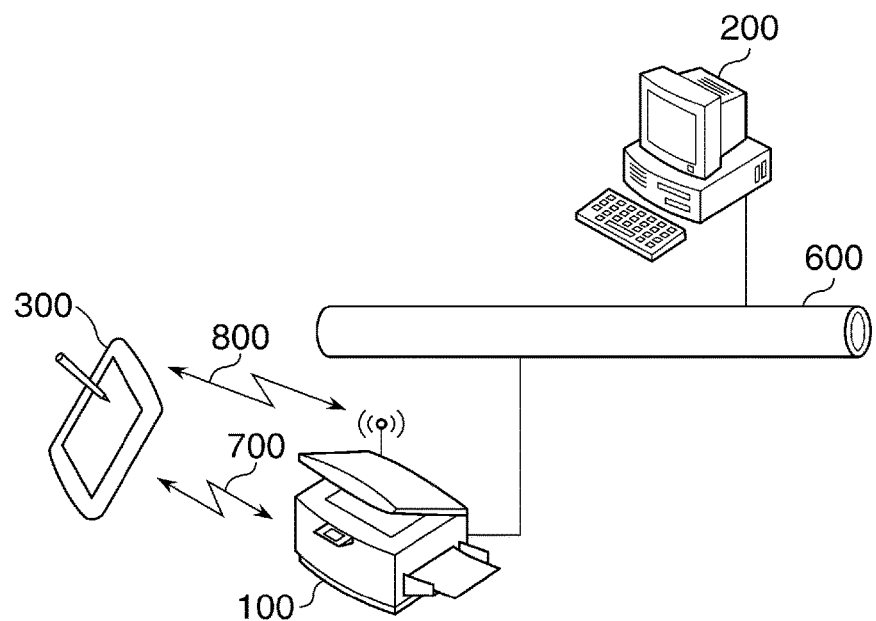
FIG. 1 is a diagram of a information processing system in its entirety, including an image forming apparatus as an information processing apparatus according to a first embodiment of the present invention.

FIG. 1 is a diagram of an information processing system in its entirety, including an image forming apparatus as an information processing apparatus according to a first embodiment of the present invention. This information processing system is comprised of the image forming apparatus, denoted by reference numeral 100, a personal computer (PC) 200, and a mobile terminal 300 as an external apparatus. The image forming apparatus 100 and the personal computer 200 are connected to each other via a wired local area network (LAN) 600.

The image forming apparatus 100 has a copy function, a print function, and a scan function. The image forming apparatus 100 includes an NFC interface for performing NFC communication 700, a wireless LAN interface for performing wireless LAN communication 800, and a wired LAN interface, as communication interfaces with external apparatuses and devices. Although the image forming apparatus 100 is equipped with the NFC function as low-speed wireless communication means, this is not limitative, but RFID or the like may be used in place of NFC. Further, although the image forming apparatus 100 supports the standards of IEEE 802.11 series for the wireless LAN communication 800, this is not limitative, but wireless communication, such as Bluetooth®, may be used.

The personal computer 200 is capable of transmitting a print job to the image forming apparatus 100, and is also capable of referring to data in an electronic format, which is made by the image forming apparatus 100. The personal computer 200 includes a wired LAN interface connected to the LAN 600. The mobile terminal 300 is a portable information processing terminal device, such as a smartphone or a tablet PC, which includes an NFC interface and a wireless LAN interface. The mobile terminal 300 is capable of communicating with the image forming apparatus 100 via the NFC communication 700, and an IP address is an example of information transmitted to or received from the image forming apparatus 100 via the NFC communication 700. Further, the mobile terminal 300 transmits image data stored in the mobile terminal 300 to the image forming apparatus 100 via the wireless LAN communication 800 to thereby make it possible to cause the image forming apparatus 100 to print the image data. The LAN 600 is a network connection implemented e.g. by Ethernet (registered trademark), and the image forming apparatus 100 and the personal computer 200 transmit and receive various data to and from each other via the LAN 600.

Figure 2:
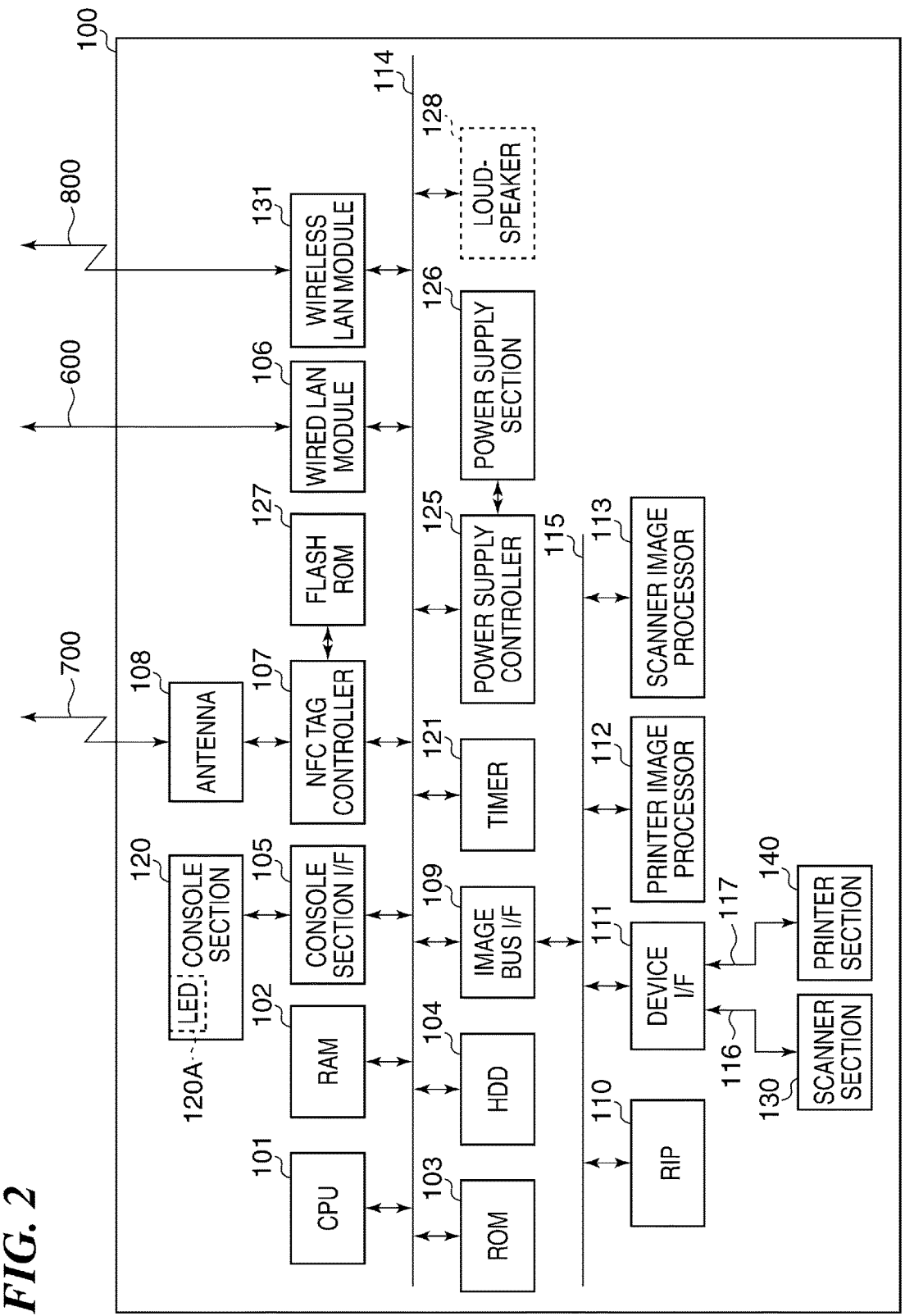
FIG. 2 is a block diagram of the image forming apparatus.

FIG. 2 is a block diagram of the image forming apparatus 100. A CPU 101 is a central processing unit that controls the overall operation of the image forming apparatus 100. A RAM 102 is a work memory for storing programs executed by the CPU 101, and temporarily storing data used for processing performed by the CPU 101. A ROM 103 stores a program used to start the image forming apparatus 100. An HDD 104 is a hard disk drive that stores software and various settings concerning the control of the image forming apparatus 100, document data, and so forth. A console section 120 is used by a user to control the image forming apparatus 100, and causes information to be input and output between the image forming apparatus 100 and the user. The console section 120 includes an LCD, a touch panel, and hardware keys (none of which are shown). To select a button displayed on the LCD, the user is only required to touch the displayed button. A console section interface 105 is an interface between the console section 120 and the CPU 101, and relays data input to or output from the console section 120. The CPU 101 controls the image forming apparatus 100 based on information on a key selected by the user and coordinate information on the touch panel (not shown), received via the console section interface 105.

An NFC tag controller 107 performs control of data transmission and reception via the NFC communication 700. The NFC tag controller 107 generates an interrupt signal in response to execution of the NFC communication 700, and thereby notifies the CPU 101 of a change in the status of the NFC tag controller 107. An antenna 108 transmits and receives radio waves for performing the NFC communication 700. A flash ROM 127 is connected to the NFC tag controller 107, and is used for temporarily holding data handled by the NFC tag controller 107. The NFC tag controller 107 and the flash ROM 127 form a near-field wireless communication tag in the present invention.

Although the image forming apparatus 100 uses the flash ROM 127 to temporarily hold the data handled by the NFC tag controller 107, this is not limitative. Any other nonvolatile memory, a combination of a battery and an SRAM, or the like, may be used in place of the flash ROM 127. A wired LAN module 106 performs control of data transmission and reception to and from an external apparatus via the LAN 600. A wireless LAN module 131 performs control of data transmission and reception via the wireless LAN communication 800. Further, the wireless LAN module 131 incorporates an antenna (not shown) for transmitting and receiving radio waves for performing the wireless LAN communication 800.

A timer 121 is implemented by a 32-bit counter that can be subjected to control, such as clearing of a count value, start and stop of time counting, checking the current count value, and the like, by instructions from a program executed by the CPU 101. Further, a threshold value can be set in the timer 121, and the timer 121 has a function for generating an interrupt signal to be sent to the CPU 101 when the count value of the timer 121 exceeds the threshold value. A power supply controller 125 controls the power supply of the image forming apparatus 100 according to an instruction from the CPU 101 or a user's operation of a power switch (not shown). When the CPU 101 detects a state in which no operation has been received from the user for a predetermined time period, or no print job has been received via the LAN 600 for a predetermined time period, the CPU 101 stops the power supply to components not requiring power, via the power supply controller 125. As a result, the image forming apparatus 100 shifts to a power-saving operation mode. The CPU 101 causes the image forming apparatus 100 to shift from the power-saving operation mode to a normal operation mode, when a user's operation is detected, when a print job is received via the LAN 600, or when execution of the NFC communication 700 is detected. The power supply controller 125 can detect a power-off operation of the power switch (not shown), and notifies the CPU 101 of a result of detection as a power-off request. Upon receipt of the power-off request, the CPU 101 causes the image forming apparatus 100 to shift to a state capable of being powered off, and instructs the power supply controller 125 to stop the power supply. A power supply section 126 is a power supply that converts AC power supplied to the image forming apparatus 100 to DC power, and turns on/off the conversion operation in response to an instruction from the power supply controller 125.

The CPU 101, the RAM 102, the ROM 103, the HDD 104, the console section interface 105, the wired LAN module 106, the wireless LAN module 131, the NFC tag controller 107, and the power supply controller 125 are connected via a system bus 114. An image bus interface 109 performs data structure conversion and data transfer between the system bus 114 and an image bus 115. The image bus 115 connects blocks in charge of image processing. More specifically, a RIP 110, a device interface 111, a printer image processor 112, and a scanner image processor 113 are connected to the image bus 15. The RIP 110 is a raster image processor (RIP), and converts a page description language (PDL) code or a display list into bitmap image data. The device interface 111 is an interface connecting between a scanner section 130 and a printer section 140, and the image bus 115, and is connected to the scanner section 130 and the printer section 140 via a scanner bus 116 and a printer bus 117, respectively. The device interface 111 adjusts the timing of transmission of image data received from the scanner section 130 via the scanner bus 116 to the image bus 115. Further, the device interface 111 adjusts the timing of transmission of image data from the image bus 115 to the printer section 140 via the printer bus 117. The scanner section 130 performs processing, such as correction and resolution conversion, dependent on the model of the image forming apparatus 100, on image data generated by a scanner sensor. The printer section 140 performs processing, such as correction and resolution conversion, dependent on a print engine of the image forming apparatus 100, on image data to be printed out.

Figure 3:
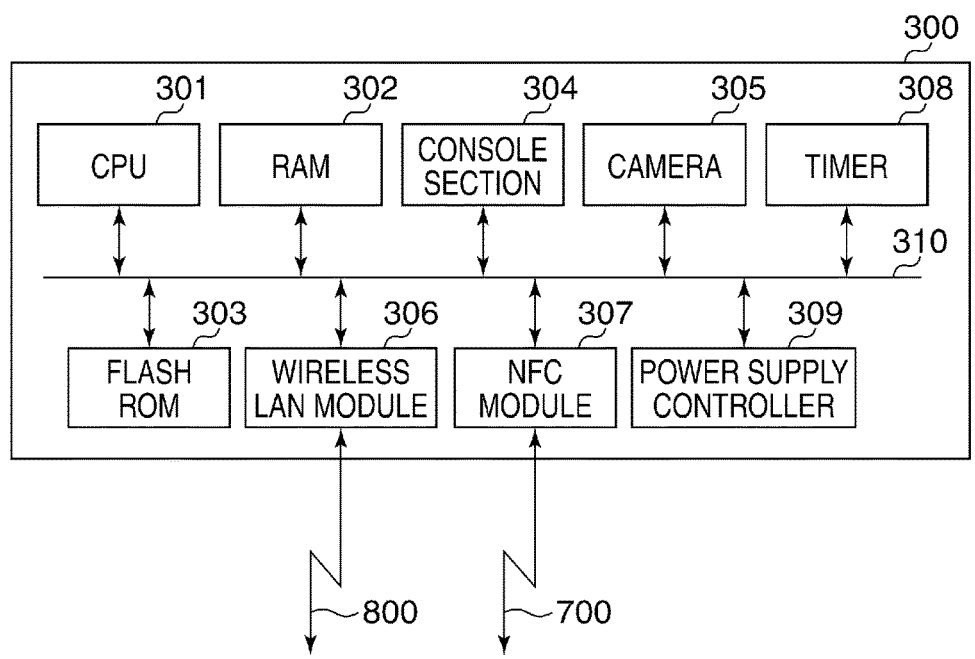
FIG. 3 is a block diagram of a mobile terminal appearing in FIG. 1.

FIG. 3 is a block diagram of the mobile terminal 300. A CPU 301 is a central processing unit that controls the overall operation of the mobile terminal 300. A RAM 302 is a work memory for storing programs executed by the CPU 301 and temporarily storing data used for processing executed by the CPU 301. A flash ROM 303 stores programs and various data used by the CPU 301. A console section 304 inputs and outputs information between the user and the mobile terminal 300, and is comprised of an LCD and a touch panel (neither of which is shown). A camera 305 photographs a still image and a moving image. A wireless LAN module 306 performs control of data transmission and reception via a wireless LAN. Further, the wireless LAN module 306 includes an antenna (not shown) for transmitting and receiving radio waves for performing the wireless LAN communication 800. An NFC module 307 performs control of data transmission and reception using NFC. Further, the NFC module 307 includes an antenna (not shown) for transmitting and receiving radio waves for performing the NFC communication 700 and a flash ROM (not shown) used to temporarily hold data handled in the NFC communication 700. A timer 308 is implemented by a 32-bit counter that can be subjected to control, such as clearing of a count value, start and stop of time counting, checking the current count value, and the like, by instructions from a program executed by the CPU 301. A power supply controller 309 supplies power to the mobile terminal 300, and is mainly implemented by a battery. The CPU 301, the RAM 302, the console section 304, the camera 305, the wireless LAN module 306, the NFC module 307, and the timer 308 have a power-saving operation mode. The power consumption of each unit is suppressed by an instruction from a program executed by the CPU 301 in cooperation with the power supply controller 309. The CPU 301, the RAM 302, the flash ROM 303, the console section 304, the camera 305, the wireless LAN module 306, the NFC module 307, and the timer 308 are connected via a system bus 310, for data transmission and reception between them.

Figure 4:
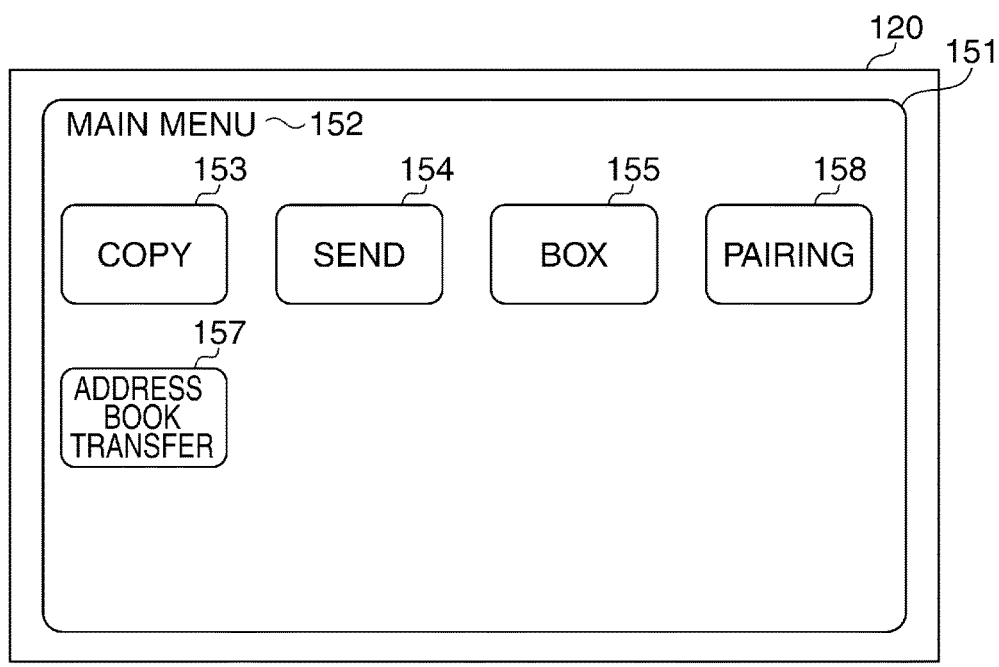
FIG. 4 is a schematic diagram of a main menu screen displayed on a console section of the image forming apparatus.

FIG. 4 is a schematic diagram of a main menu screen displayed on the control section 120 of the image forming apparatus 100. The display of the main menu screen shown in FIG. 4 is controlled by the CPU 101 based on software stored in the ROM 103 and the HDD 104.

The main menu screen, denoted by reference numeral 151, is displayed on the console section 120 after the image forming apparatus 100 has been started up. In the image forming apparatus 100 having introduced a user authentication service (not shown), however, the displayed screen is changed to the main menu screen 151 in a case where the user authentication is successful. As a title 152, "MAIN MENU" is displayed on the main menu screen. A copy button 153 is selected when a user intends to cause the image forming apparatus 100 to perform the copy function. A send button 154 is selected when the user intends to cause the image forming apparatus 100 to perform a send function. A box button 155 is selected when the user intends to cause the image forming apparatus 100 to perform a box function. A pairing button 156 is selected when the user intends to cause the image forming apparatus 100 to perform a pairing function.

The pairing function is a function for connecting the image forming apparatus 100 and the mobile terminal 300 using the wireless LAN communication 800. In the present embodiment, with the pairing function, an IP address of the image forming apparatus 100 is transmitted to the mobile terminal 300 via the NFC communication 700, and then, the mobile terminal 300 sets the received IP address as a transmission destination IP address of wireless LAN communication. However, the pairing function is not limited to this, but a setting process for connecting the image forming apparatus 100 and the mobile terminal 300 may be performed using any other suitable wireless communication technique including Bluetooth®.

The setting of the pairing function corresponds to "second interrupt setting" in the present invention, which is a setting of causing the NFC tag controller 107 to generate an interrupt signal when information written in the flash ROM 127 is read by the mobile terminal 300 which is an external apparatus. In the present embodiment, as the information read from the flash ROM 127 by the external apparatus (the mobile terminal 300), there is mentioned, by way of example, information (IP address of the image forming apparatus 100) for connecting the external apparatus using a wireless communication method (wireless LAN communication) higher in speed than NFC communication.

An address book transfer button 157 is a button selected when performing an address book transmission function between the image forming apparatus 100 and the mobile terminal 300. In the present embodiment, the address book transmission function transmits address book data held in the mobile terminal 300 to the image forming apparatus 100. However, the address book transmission function is not limited to this, but the address book data held in the image forming apparatus 100 may be transmitted to the mobile terminal 300, or a mechanism for causing the user to select the direction of data transfer may be provided. The setting of the address book transmission function corresponds to "first interrupt setting" in the present invention, which is a setting of causing the NFC tag controller 107 to generate an interrupt signal when information is written into the flash ROM 127 by the mobile terminal 300 which is the external apparatus. In the present embodiment, as the information written into the flash ROM 127 by the external apparatus (the mobile terminal 300), there is mentioned the address book data, by way example.

Figure 5:
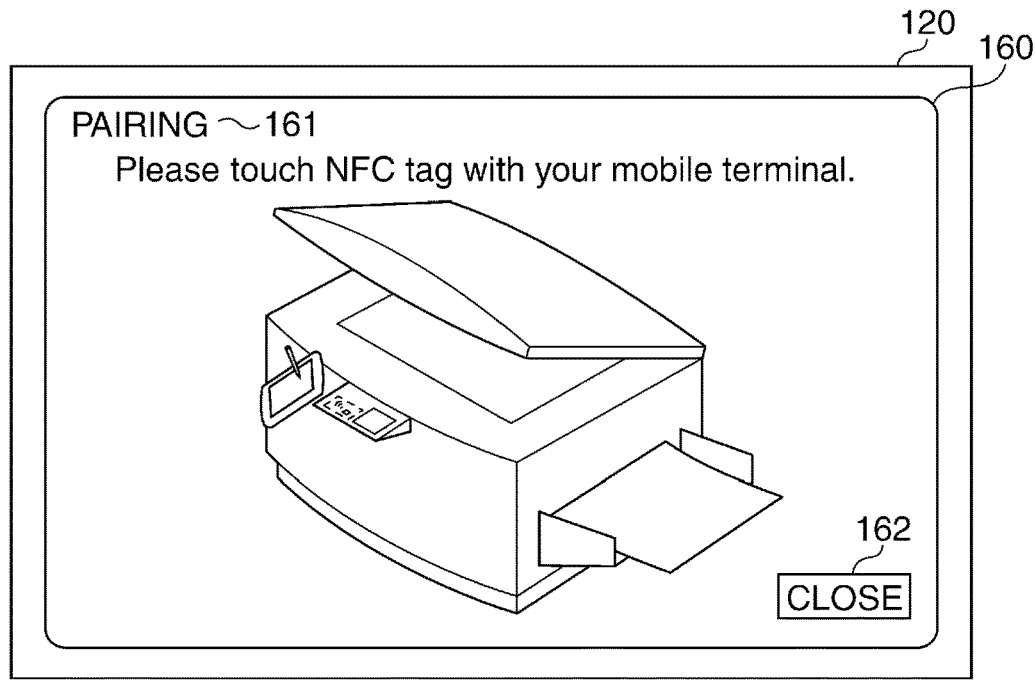
FIG. 5 is a schematic diagram of a pairing menu screen displayed on the console section.

FIG. 5 is a schematic diagram of a pairing menu screen displayed on the console section 120. The display of the pairing menu screen is controlled by the CPU 101 based on the software stored in the ROM 103 and the HDD 104. The screen is changed to the pairing menu screen, denoted by reference numeral 160, when the pairing button 156 is pressed on the main menu screen 151 shown in FIG. 4. As a title 161, "PAIRING" is displayed on the pairing menu screen 160. When pairing is performed between the image forming apparatus 100 and the mobile terminal 300, the user performs an operation for pairing according to the display on the pairing menu screen 160. When the user presses a close button 162 after performing the operation for pairing, the CPU 101 causes the main menu screen 151 to be displayed on the console section 120.

Figure 6:
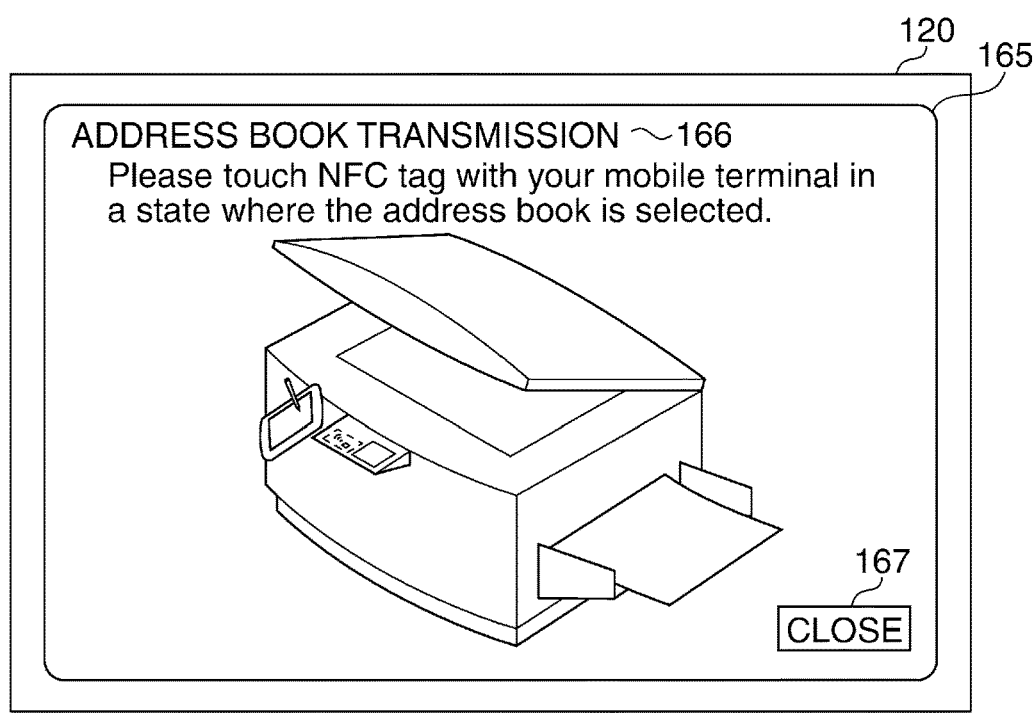
FIG. 6 is a schematic diagram of an address book transmission menu screen displayed on the console section.

FIG. 6 is a schematic diagram of an address book transmission menu screen displayed on the console section 120. The display of the address book transmission menu screen is controlled by the CPU 101 based on the software stored in the ROM 103 and the HDD 104. The screen is changed to the address book transmission menu screen, denoted by reference numeral 165, when the address book transfer button 157 is pressed on the main menu screen 151 shown in FIG. 4. As a title 166, "ADDRESS BOOK TRANSMISSION" is displayed on the address book transmission menu screen 165. When transmitting the address book data from the mobile terminal 300 to the image forming apparatus 100, the user performs an operation for address book transmission according to the display on the address book transmission menu screen 165. When the user presses a close button 167 after performing the operation for address book transmission, the CPU 101 causes the main menu screen 151 to be displayed on the console section 120.

Figure 7:
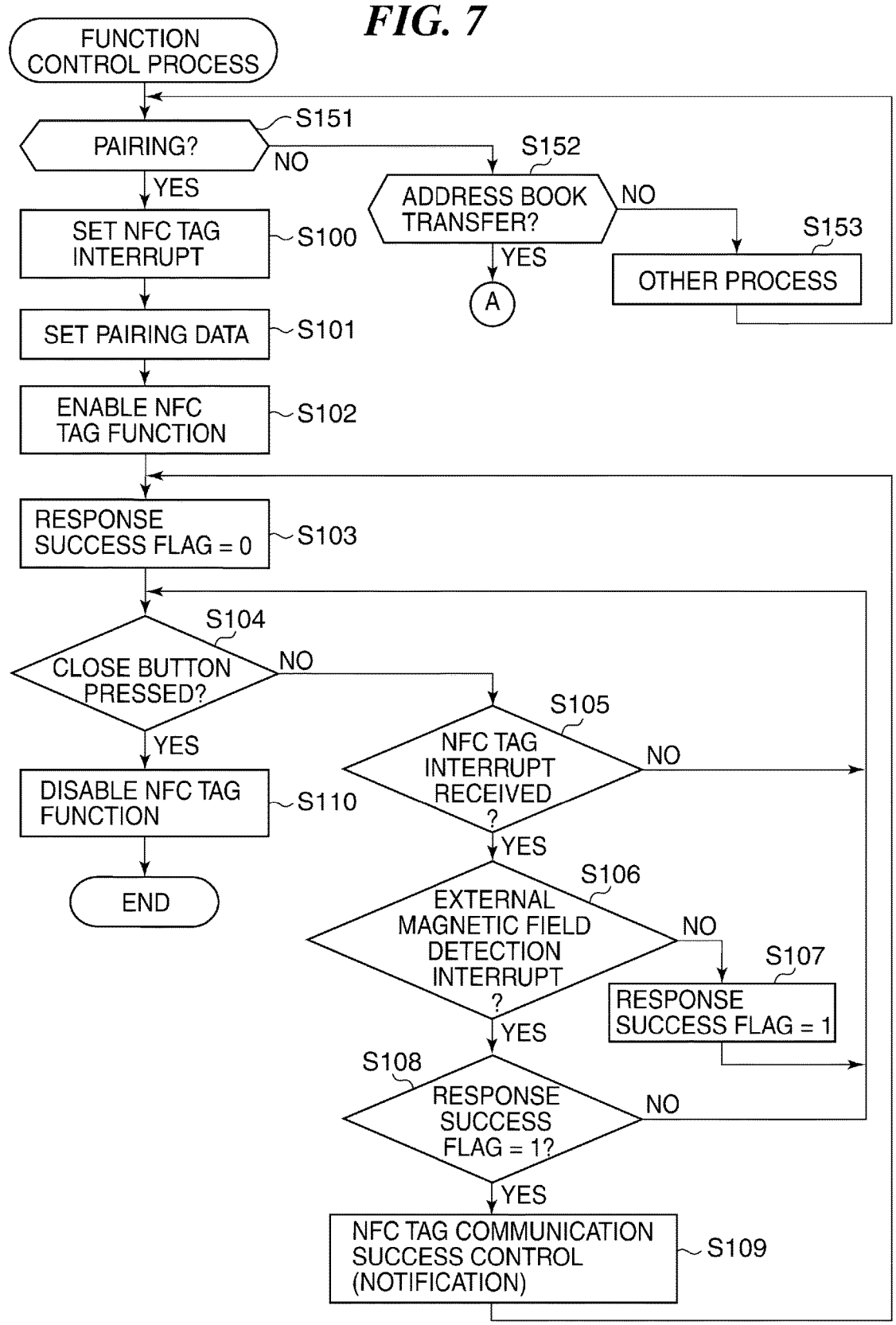
FIG. 7 is a flowchart of a function control process performed by the image forming apparatus.
Figure 8:
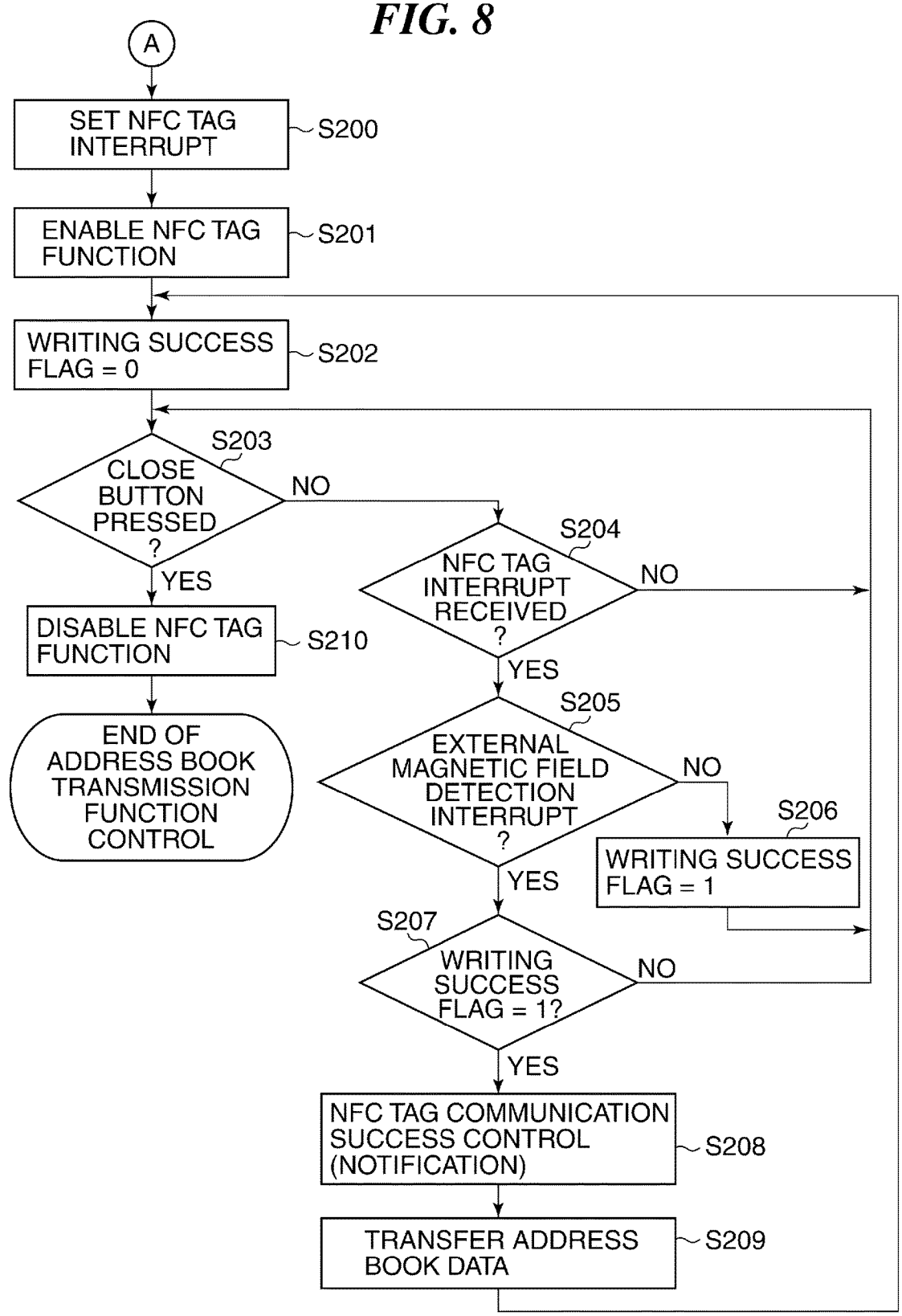
FIG. 8 is a continuation of FIG. 7.

FIGS. 7 and 8 are a flowchart of a function control process performed by the image forming apparatus 100. This function control process is started when the main menu screen 151 (FIG. 4) is displayed, and is controlled by the CPU 101 based on the software stored in the ROM 103 and the HDD 104.

First, the CPU 101 determines whether or not the pairing button 156 has been pressed on the main menu screen 151 (step S151), and if the pairing button 156 has been pressed, the process proceeds to pairing function control processing in a step S100 et seq. In this case, the second interrupt setting is selected. If the pairing button 156 has not been pressed, the CPU 101 determines whether or not the address book transfer button 157 has been pressed (step S152). If the address book transfer button 157 has been pressed, the process proceeds to address book transmission function control processing in a step S200 et seq. in FIG. 8. In this case, the first interrupt setting is selected. If the address book transfer button 157 has not been pressed, the CPU 101 executes the other processing (step S153), and returns to the step S151. In the other processing, processing corresponding to the copy button 153, the send button 154, or the like, is performed.

As described above, when the pairing button 156 or the address book transfer button 157 is pressed, the CPU 101 sets an operation mode concerning near-field wireless communication (NFC) according to an instruction of the user. The CPU 101 functions as a first setting unit in the present invention, which is configured to set the operation mode (a pairing function-setting mode or an address book transmission function-setting mode). Then, the function control processing to be executed is determined in the step S151 or S152. Therefore, the CPU 101 functions as a second setting unit configured to select the first interrupt setting or the second interrupt setting.

Incidentally, the NFC tag controller 107 is capable of generating an external magnetic field detection interrupt, a response success interrupt, and a writing success interrupt, and as for the response success interrupt and the writing success interrupt, one of them can be selected. The external magnetic field detection interrupt is generated when the NFC tag controller 107 has detected a magnetic field generated outside the image forming apparatus 100 via the antenna 108. Therefore, the external magnetic field detection interrupt indicates that an external apparatus has approached the image forming apparatus 100. The response success interrupt is generated when the NFC tag controller 107 has normally sent a response to a command received from the mobile terminal 300 via the NFC communication 700. The writing success interrupt is generated when the NFC tag controller 107 has normally written data received from the mobile terminal 300 via the NFC communication 700 into the flash ROM 127.

In the step S100 in FIG. 7, the CPU 101 sets the NFC tag controller 107 via the system bus 114 to set the type of the interrupt signal to be generated by the NFC tag controller 107. Since this is a case where the pairing function control processing is performed, the CPU 101 sets the NFC tag controller 107 to select the external magnetic field detection interrupt and the response success interrupt (second interrupt setting), as the NFC tag interrupt setting.

Next, in a step S101, the CPU 101 performs the pairing data setting. More specifically, the CPU 101 sends pairing data to the NFC tag controller 107 via the system bus 114. Then, the NFC tag controller 107 holds the received pairing data in the flash ROM 127. Next, the CPU 101 sets the NFC tag controller 107 via the system bus 114 to enable the NFC tag function (step S102). The CPU 101 forms a response success flag (not shown) as a local variable in a free space of the RAM 102, and sets 0 as the value of the response success flag (step S103). The response success flag is a software flag for determining whether or not the mobile terminal 300 has normally read the pairing data from the image forming apparatus 100 via the NFC communication 700.

Next, the CPU 101 determines via the system bus 114 whether or not the close button 162 (FIG. 5) has been pressed via the touch panel (not shown) included in the console section 120 (step S104). If it is determined in the step S104 that the close button 162 has not been pressed, the CPU 101 checks for an interrupt signal generated by the NFC tag controller 107, and determines whether or not the interrupt signal has been received (step S105). If it is determined in the step S105 that the interrupt signal has not been received, the process returns to the step S104. On the other hand, if the interrupt signal generated by the NFC tag controller 107 has been received, the CPU 101 checks the type of the received interrupt signal, and determines whether or not the type of the received interrupt signal is the external magnetic field detection interrupt (step S106).

If it is determined in the step S106 that the type of the received interrupt signal is not the external magnetic field detection interrupt, the type of the received interrupt signal is the response success interrupt, and hence the CPU 101 sets the response success flag to 1 (step S107), and returns to the step S104. On the other hand, if the type of the received interrupt signal is the external magnetic field detection interrupt, the CPU 101 determines whether or not the response success flag is equal to 1 (step S108). If it is determined in the step S108 that the response success flag is not equal to 1, the process returns to the step S104. On the other hand, if the response success flag is equal to 1, the CPU 101 notifies the user of success in the NFC communication 700, for NFC tag communication success control (step S109), and the process returns to the step S103. In this NFC tag communication success control, the CPU 101 notifies the user of the success by displaying on the console section 120 a message to the effect that the NFC communication 700 is successful. However, the manner of notification is not limited to this, but the notification may be performed by providing an LED 120A on the console section 120 and performing lighting control of the LED 120A, or may be performed by providing a loudspeaker 128, and causing the loudspeaker 128 to output sound. By performing this NFC tag communication success control, it is possible to notify the user of successful termination of the communication.

If it is determined in the step S104 that the close button 162 has been pressed, the CPU 101 sets the NFC tag controller 107 via the system bus 114 to disable the NFC tag function (step S110), followed by terminating the function control process.

In the step S200 in FIG. 8 (in the case where the address book transfer button 157 is pressed in the step S152 in FIG. 7), the CPU 101 sets the NFC tag controller 107 via the system bus 114 so as to set the type of the interrupt signal to be generated by the NFC tag controller 107. Since this is a case where the address book transmission function control processing is performed, the CPU 101 sets, as the NFC tag interrupt setting, the NFC tag controller 107 to select the external magnetic field detection interrupt and the writing success interrupt (first interrupt setting). Next, the CPU 101 sets the NFC tag controller 107 via the system bus 114 to enable the NFC tag function (step S201). The CPU 101 forms a writing success flag (not shown) as a local variable in a free space of the RAM 102, and sets 0 as the value of the writing success flag (step S202). The writing success flag is a software flag for determining whether or not the mobile terminal 300 has normally written the address book data into the image forming apparatus 100 via the NFC communication 700.

Next, the CPU 101 determines via the system bus 114 whether or not the close button 167 (FIG. 6) has been pressed via the touch panel (not shown) included in the console section 120 (step S203). If it is determined in the step S203 that the close button 167 has not been pressed, the CPU 101 checks for an interrupt signal generated by the NFC tag controller 107, and determines whether or not the interrupt signal has been received (step S204). If it is determined in the step S204 that the interrupt signal has not been received, the process returns to the step S203. On the other hand, if the interrupt signal generated by the NFC tag controller 107 has been received, the CPU 101 checks the type of the received interrupt signal, and determines whether or not the type of the received interrupt signal is the external magnetic field detection interrupt (step S205).

If it is determined in the step S205 that the type of the received interrupt signal is not the external magnetic field detection interrupt, the type of the received interrupt signal is the writing success interrupt, and hence the CPU 101 sets the writing success flag to 1 (step S206), whereafter the process returns to the step S203. On the other hand, if the type of the received interrupt signal is the external magnetic field detection interrupt, the CPU 101 determines whether or not the writing success flag is equal to 1 (step S207). If it is determined in the step S207 that the writing success flag is not equal to 1, the process returns to the step S203. On the other hand, if the writing success flag is equal to 1, the CPU 101 notifies the user of success in the NFC communication 700, for the NFC tag communication success control e.g. in the same manner as in the step S109 (step S208). By performing this NFC tag communication success control, it is possible to notify the user of successful termination of the communication.

Next, in a step S209, the CPU 101 performs address book data transfer processing. More specifically, to make the address book data transmitted from the mobile terminal 300 via the NFC communication 700 and held in the flash ROM 127 usable by the image forming apparatus 100, the CPU 101 instructs the NFC tag controller 107 via the system bus 114 to transmit the address book data, whereby the address book data is transferred from the flash ROM 127, whereafter the CPU 101 merges the address book data held in the HDD 104 and the address book data received from the mobile terminal 300 via the NFC communication 700 and thus transferred from the flash ROM 127 to thereby make the resulting data usable by the user.

In the present embodiment, the image forming apparatus 100 stores the address book data received via the NFC communication 700 in the HDD 104. However, this is not limitative, but from a viewpoint of security, the address book data received via the NFC communication 700 may be stored only in the RAM 102 and be deleted when the image forming apparatus 100 is powered off.

If it is determined in the step S203 that the close button 167 has been pressed, the CPU 101 sets the NFC tag controller 107 via the system bus 114 to disable the NFC tag function (step S210), followed by terminating the function control process.

According to the present embodiment, when one of the address book transfer button 157 and the pairing button 156 is pressed on the main menu screen 151 (FIG. 4), the operation mode concerning NFC is set. Then, the CPU 101 selects one of the first interrupt setting and the second interrupt setting, for the NFC tag interrupt setting, based on the set operation mode. In the first interrupt setting (address book transmission function), the data is transferred from the mobile terminal 300 to the image forming apparatus 100. In the second interrupt setting (pairing function setting), the data is transferred from the image forming apparatus 100 to the mobile terminal 300. Therefore, it is possible to perform the interrupt setting of the near-field wireless communication tag by taking into account the direction of data transfer.

Further, the operation mode is set based on an operation received from a user, and hence this is user-friendly. Further, when the external magnetic field detection interrupt is generated after the response success interrupt or the writing success interrupt has been generated, success in the communication is notified (steps S109 and S208). This makes it possible to notify the user of successful communication.

Next, a second embodiment of the present invention will be described. In the second embodiment, setting information indicative of the set operation mode is held even in a state where the image forming apparatus 100 as an information processing apparatus according to the second embodiment is powered off, and when the image forming apparatus 100 is powered on next time, the operation mode is set based on the held setting information. One of the pairing function and the address book transmission function is selected by a user, and the setting information concerning the selected function is set and registered. Therefore, differently from the first embodiment, the second embodiment will be described with reference to FIG. 9 in place of FIG. 4, and further, with reference to FIGS. 10A to 12. The information processing system including the image forming apparatus 100 and the mobile terminal 300 has the same basic configuration as that of the first embodiment (FIGS. 1 to 3). The second embodiment will be described also with reference to part of FIGS. 7 and 8.

Figure 9:
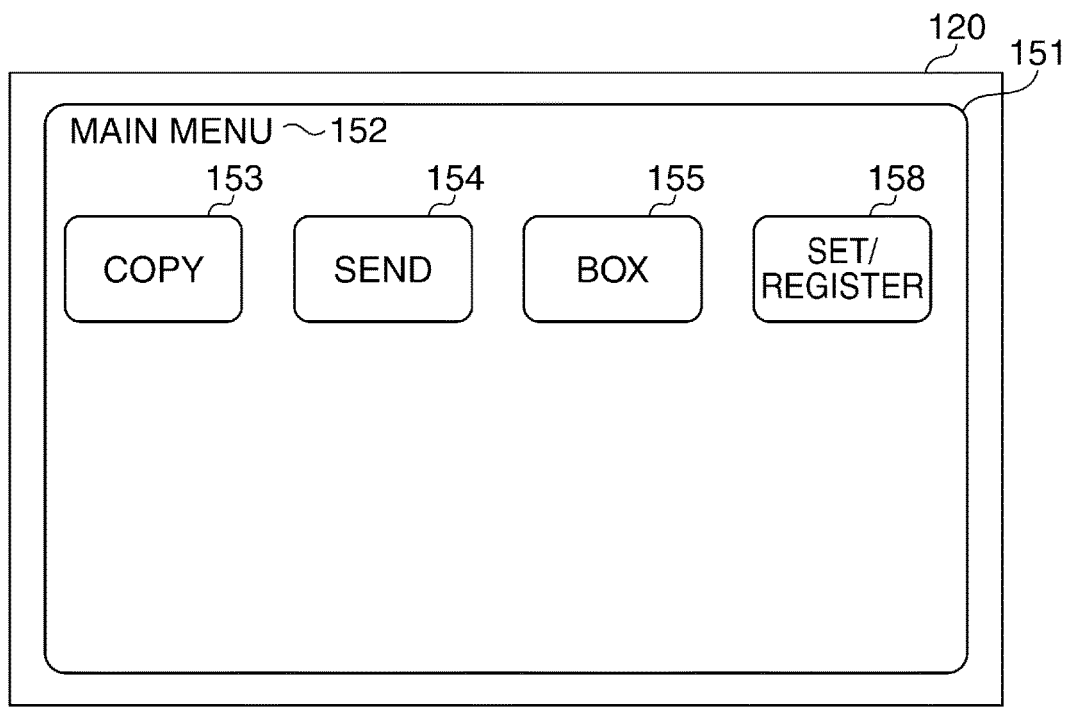
FIG. 9 is a schematic diagram of a main menu screen displayed on a console section of an image forming apparatus as an information processing apparatus according to a second embodiment of the present invention.

FIG. 9 is a schematic diagram of a main menu screen displayed on the console section 120 in the second embodiment. The description will be mainly given with reference to different part of FIG. 9 from FIG. 4. A set/register button 158 is a button selected when the operation of the image forming apparatus 100 is set or the registered information is changed. In the present embodiment, when the user presses the set/register button 158, one of the pairing function and the address book transmission function is selected. Through these operations, an "NFC tag function set value" is set which is the setting information indicative of the operation mode.

Figure 10A:
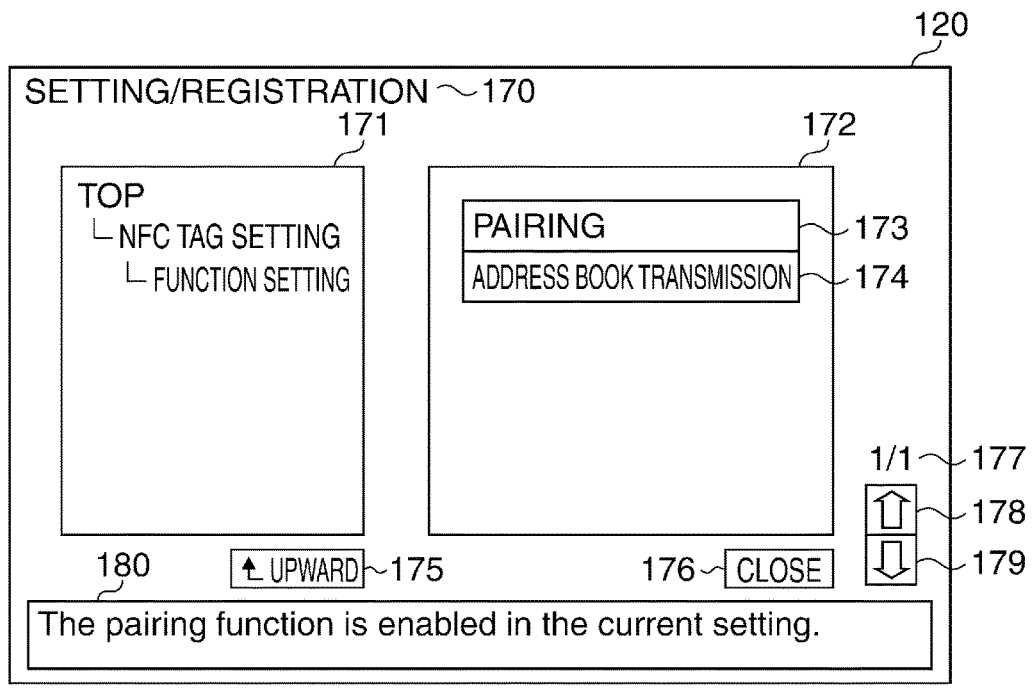
Figure 10B:
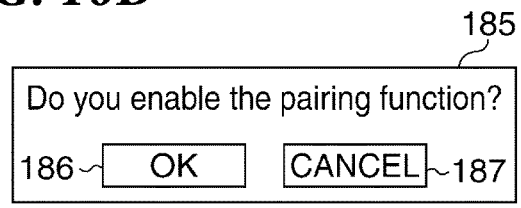
Figure 10C:
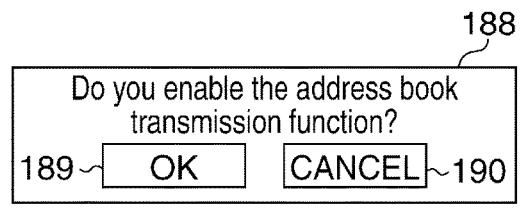

FIGS. 10A, 10B, and 10C are schematic diagrams each showing a user interface screen for registering/changing settings displayed on the console section 120. These screens are controlled by the CPU 101 based on the software stored in the ROM 103 and the HDD 104.

First, a setting/registration menu screen shown in FIG. 10A is displayed on the console section 120 when the set/register button 158 is selected on the main menu screen 151 (FIG. 9). As a title 170, "SETTING/REGISTRATION" is displayed on the setting/registration menu screen. A hierarchy window 171 showing a hierarchical representation of the setting/registration menu notifies the user of hierarchical information of the currently selected setting/registration menu of the image forming apparatus 100. A detailed menu display window 172 displays a list of menu options which can be selected by the user in the current menu hierarchy. On the setting/registration menu screen displayed in FIG. 10A, the user can select a service which can be performed by the image forming apparatus 100 via the NFC communication 700. A pairing selection button 173 is selected for enabling the pairing function via the NFC communication 700. An address book transmission selection button 174 is selected for enabling the address book transmission function via the NFC communication 700. In the present embodiment, the setting information (NFC tag function set value) registered via the setting/registration menu is stored in the HDD 104 by the control of the CPU 101. Therefore, the various settings are saved even when the image forming apparatus 100 is powered off.

An upward button 175 is a button selected by the user when the user intends to move from the current hierarchy level to one upper menu hierarchy level. A close button 176 is a button selected by the user when the user intends to close the displayed menu. A page number display area 177 notifies the user of the currently displayed page number of menu options formed by at least one page. A preceding page selection button 178 is a button for giving an instruction for moving the page from the currently displayed page to the immediately preceding page of the menu options formed by the at least one page, which is linked to the page number display area 177. A following page selection button 179 is a button for giving an instruction for moving the page from the currently displayed page to the immediately following page of the menu options formed by the at least one page, which is linked to the page number display area 177. A message display area 180 notifies the user of a message, such as a simple explanation associated with a menu option selected by the user. In the illustrated example, the message field 180 displays a message to the effect that the pairing function is selected as a service which can be performed by the image forming apparatus 100 via the NFC communication 700.

FIG. 10B shows a pairing setting confirmation window 185 displayed on the console section 120 when the pairing selection button 173 has been pressed. When the user intends to enable the pairing function, the user presses a setting OK button 186. Upon detection of pressing of the setting OK button 186, the CPU 101 causes the NFC tag controller 107 to perform the setting of the pairing function and updates the corresponding set value stored in the HDD 104. After that, the CPU 101 displays the setting/registration menu screen (FIG. 10A) on the console section 120. On the other hand, when the user intends to cancel a setting operation for the pairing function, the user presses a setting cancel button 187. Upon detection of pressing of the setting cancel button 187, the CPU 101 displays the setting/registration menu screen on the console section 120.

FIG. 10C shows an address book transmission setting confirmation window 188 which is displayed on the console section 120 when the address book transmission selection button 174 is pressed. When the user intends to enable the address book transmission function, the user presses a setting OK button 189. Upon detection of pressing of the setting OK button 189, the CPU 101 causes the NFC tag controller 107 to perform the setting of the address book transmission function, and updates the corresponding set value stored in the HDD 104. After that, the CPU 101 displays the setting/registration menu screen on the console section 120. On the other hand, when the user intends to cancel a setting operation for the address book transmission function, the user presses a setting cancel button 190. Upon detection of pressing of the setting cancel button 190, the CPU 101 displays the setting/registration menu screen on the console section 120.

Figure 11A:
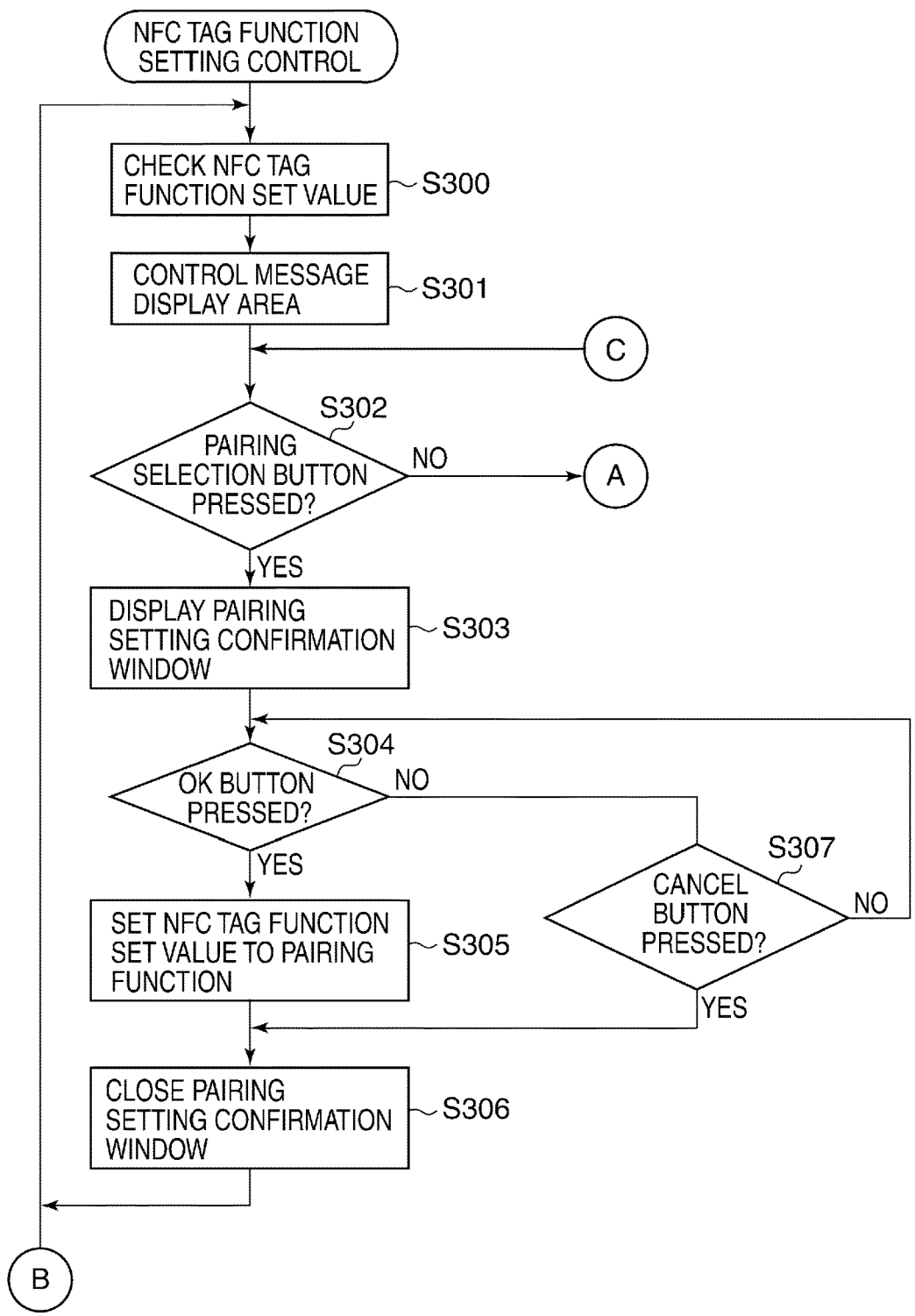
FIGS. 11A and 11B are a flowchart of an NFC tag function-setting control process performed by the image forming apparatus.
Figure 11B:
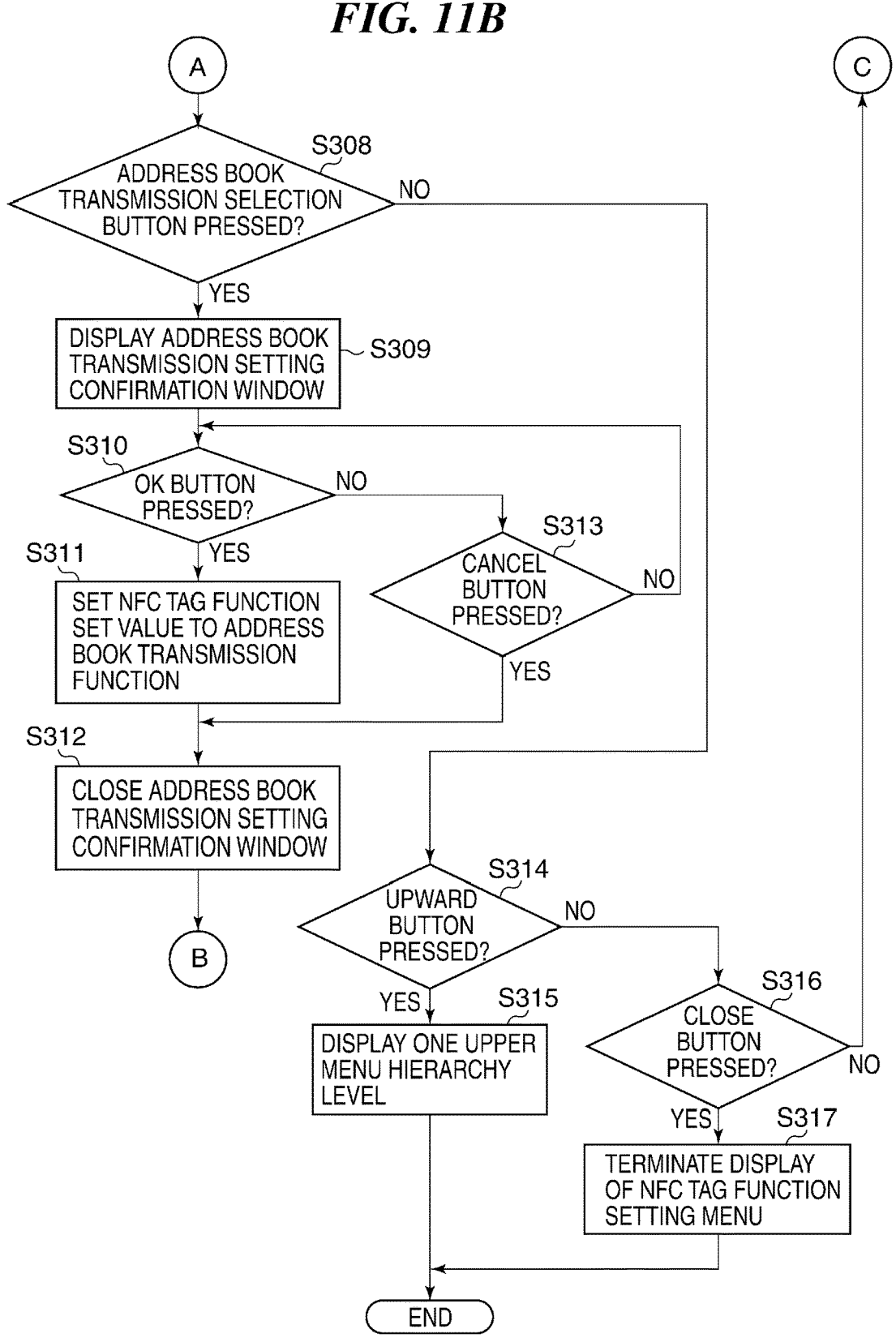

FIGS. 11A and 11B are a flowchart of an NFC tag function-setting control process performed by the image forming apparatus 100. This NFC tag function-setting control process is controlled by the CPU 101 based on the software stored in the ROM 103 and the HDD 104 in a state where the setting/registration menu screen shown in FIG. 10A is displayed.

First, the CPU 101 checks the NFC tag function set value stored in the HDD 104 (step S300). The NFC tag function set value is the setting information set or updated in steps S305 and S311, referred to hereinafter. Next, the CPU 101 causes the current setting state to be displayed in the message display area 180 based on the NFC tag function set value (step S301). The CPU 101 performs control based on a user's operation on the touch panel, and first, determines whether or not the pairing selection button 173 has been pressed on the setting/registration menu screen (FIG. 10A) (step S302). If it is determined in the step S302 that the pairing selection button 173 has been pressed, the CPU 101 causes the pairing setting confirmation window 185 (FIG. 10B) to be displayed (step S303).

Then, the CPU 101 determines whether or not the setting OK button 186 has been pressed on the pairing setting confirmation window 185 (step S304). If the setting OK button 186 has not been pressed, the CPU 101 determines whether or not the setting cancel button 187 has been pressed (step S307). The CPU 101 repeats the steps S304 and S307 until one of these buttons is pressed. When the setting OK button 186 has been pressed, the CPU 101 causes the NFC tag controller 107 to perform the setting of the pairing function and updates the NFC tag function set value stored in the HDD 104 (step S305). As a result, the set value indicating that the pairing function is enabled is stored. Although the setting of the pairing function refers to the NFC tag interrupt setting and the pairing data setting, this is not limitative, but the setting of the pairing function may include the NFC tag function enabling setting or the NFC tag function disabling setting, depending on the necessity of the update of the setting information.

Then, the process proceeds to a step S306. If it is determined in the step S307 that the setting cancel button 187 has been pressed, the process also proceeds to the step S306. In the step S306, the CPU 101 causes the pairing setting confirmation window 185 to be closed, i.e. cease to be displayed, and returns to the step S300.

If it is determined in the step S302 that the pairing selection button 173 has not been pressed, the CPU 101 determines whether or not the address book transmission selection button 174 has been pressed (step S308). If it is determined in the step S308 that the address book transmission selection button 174 has been pressed, the CPU 101 causes the address book transmission setting confirmation window 188 (FIG. 10C) to be displayed (step S309). Next, the CPU 101 determines whether or not the setting OK button 189 has been pressed on the address book transmission setting confirmation window 188 (step S310). If the setting OK button 189 has not been pressed, the CPU 101 determines whether or not the setting cancel button 190 has been pressed (step S313). The CPU 101 repeats the steps S310 and S313 until one of these buttons is pressed. When the setting OK button 189 has been pressed, the CPU 101 causes the NFC tag controller 107 to perform the setting of the address book transmission function and updates the NFC tag function set value stored in the HDD 104 (step S311). As a result, the set value indicating that the address book transmission function is enabled is stored. Although the setting of the address book transmission function refers to the NFC tag interrupt setting, this is not limitative, but the setting of the address book transmission function may include the NFC tag function enabling setting or the NFC tag function disabling setting, depending the necessity of the update of the setting information.

Then, the process proceeds to a step S312. If it is determined in the step S313 that the setting cancel button 190 has been pressed, the process also proceeds to the step S312. In the step S312, the CPU 101 causes the address book transmission setting confirmation window 188 to be closed, i.e. cease to be displayed, and returns to the step S300.

If it is determined in the step S308 that the address book transmission selection button 174 has not been pressed, the CPU 101 determines whether or not the upward button 175 has been pressed on the setting/registration menu screen (FIG. 10A) (step S314). If the upward button 175 has been pressed, the CPU 101 cause one upper menu hierarchy level to be displayed (step S315), and terminates the NFC tag function-setting control process in FIGS. 11A and 11B. On the other hand, if the upward button 175 has not been pressed, the CPU 101 determines whether or not the close button 176 has been pressed (step S316). If it is determined in the step S316 that the close button 176 has not been pressed, the CPU 101 returns to the step S302, whereas if the close button 176 has been pressed, the CPU 101 causes the display of the NFC tag function setting menu to be terminated (step S317). The NFC tag function set value stored in the HDD 104 at this time remains without being deleted even when the image forming apparatus 100 is powered off, and is read out when the image forming apparatus 100 is powered on next time. Note that a storage device storing the NFC tag function set value is only required to be capable of maintaining its storage function even after the image forming apparatus 100 is powered off, and hence the storage device may be e.g. a nonvolatile memory other than the HDD 104.

After execution of the step S317, the NFC tag function-setting control process in FIGS. 11A and 11B is terminated. Note that in a case where it is determined in the step S316 that the close button 176 has not been pressed, display processing for changing the page according to pressing of the preceding page selection button 178 or the following page selection button 179 may be executed.

Figure 12:
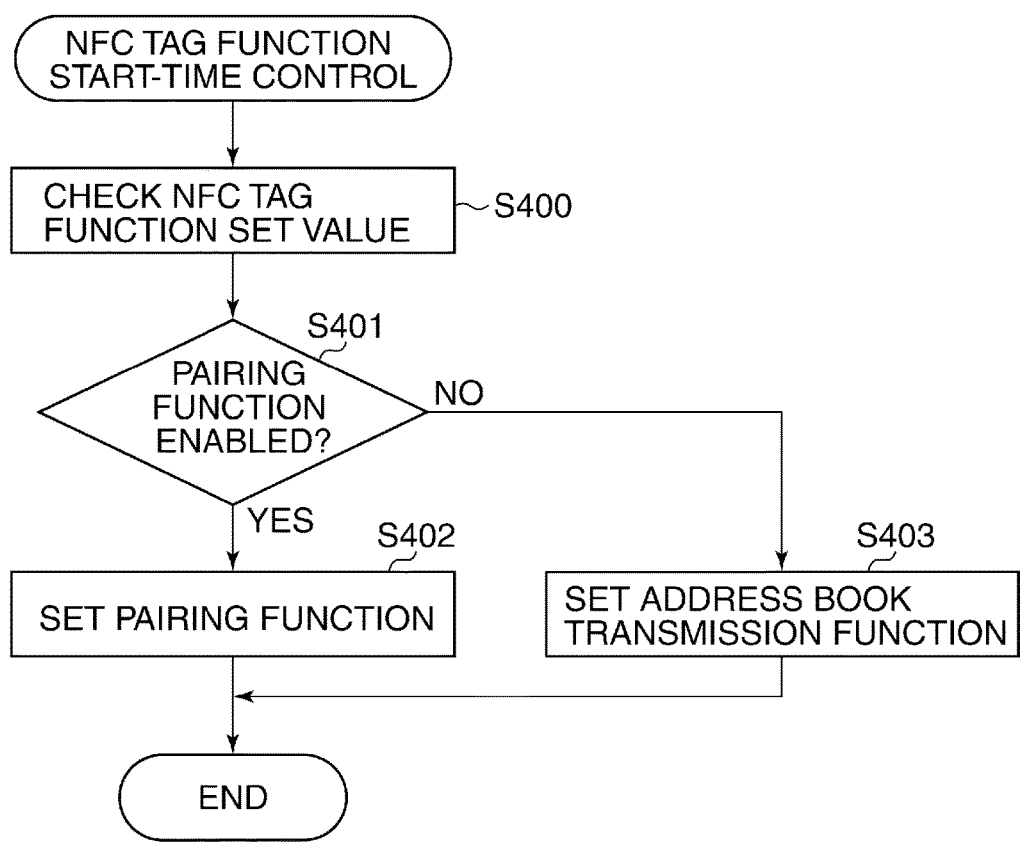
FIG. 12 is a flowchart of an NFC tag function start-time control process performed by the image forming apparatus.

FIG. 12 is a flowchart of an NFC tag function start-time control process performed by the image forming apparatus 100. This process is controlled, as part of a startup process which is started when the image forming apparatus 100 is powered on, by the CPU 101 based on the software stored in the ROM 103 and the HDD 104.

First, the CPU 101 checks the NFC tag function set value stored in the HDD 104 (step S400). The CPU 101 determines whether or not the set value indicating that the pairing function is enabled is stored as the NFC tag function set value (step S401). If it is determined in the step S401 that the set value indicating that the pairing function is enabled is stored as the NFC tag function set value, the CPU 101 proceeds to a step S402. On the other hand, if the set value indicating that the pairing function is enabled is not stored as the NFC tag function set value, it is a case where the set value indicating that the address book transmission function is enabled is stored as the NFC tag function set value, and hence the CPU 101 proceeds to a step S403.

In the step S402, the CPU 101 causes the NFC tag controller 107 to perform the setting of the pairing function. The setting of the pairing function in this step refers to the NFC tag interrupt setting (corresponding to the step S100 in FIG. 7) and the pairing data setting (corresponding to the step S101 in FIG. 7). After execution of the step S402, the steps S102 to S109 in FIG. 7 concerning the pairing function control processing are executed. The setting of the pairing function is not limited to this, but may include the NFC tag function enabling setting or the NFC tag function disabling setting, depending on the necessity of the update of the setting information.

In the step S403, the CPU 101 causes the NFC tag controller 107 to perform the setting of the address book transmission function. The setting of the address book transmission function in this step refers to the NFC tag interrupt setting (corresponding to the step S200 in FIG. 8). After execution of the step S403, the steps S201 to S209 in FIG. 8 concerning the address book transmission function control processing are executed. The setting of the address book transmission function is not limited to this, but may include the NFC tag function enabling setting or the NFC tag function disabling setting, depending on the necessity of the update of the setting information.

According to the present embodiment, it is possible to obtain the same advantageous effects as provided by the first embodiment in configuring interrupt settings of the near-field wireless communication tag by taking into account the direction of data transfer, and notifying the user of successful termination of the communication.

Further, the NFC tag function set value set by the user is held as the setting information indicative of the operation mode even after the image forming apparatus is powered off, and when the image forming apparatus is powered on again, the operation mode is set based on the held NFC tag function set value. Then, one of the first interrupt setting and the second interrupt setting is selected based on the operation mode. Therefore, it is possible to set the operation mode and select the interrupt setting, immediately after the apparatus is started up.

Next, a third embodiment of the present invention will be described. In the third embodiment, the image forming apparatus 100 as an information processing apparatus according to the third embodiment makes it possible to perform the pairing function and the address book transmission function by one-touch operation by a user. The one-touch operation refers to a user's operation of causing the NFC module 307 of the mobile terminal 300 to move closer to the antenna 108 of the image forming apparatus 100 only once to thereby perform the NFC communication 700. As the interrupt settings which can be selected and set by the CPU 101, a third interrupt setting is added to the above-described first interrupt setting and second interrupt setting. The third interrupt setting is a setting of causing an interrupt signal to be generated when information written in the flash ROM 127 is read by the mobile terminal 300 or when information is written into the flash ROM 127 by the mobile terminal 300.

Differently from the second embodiment, the third embodiment will be described with reference to FIGS. 13A, 13B and 16 in place of FIGS. 10A to 12, and further, with reference to FIGS. 14 and 15.

Figure 13A:
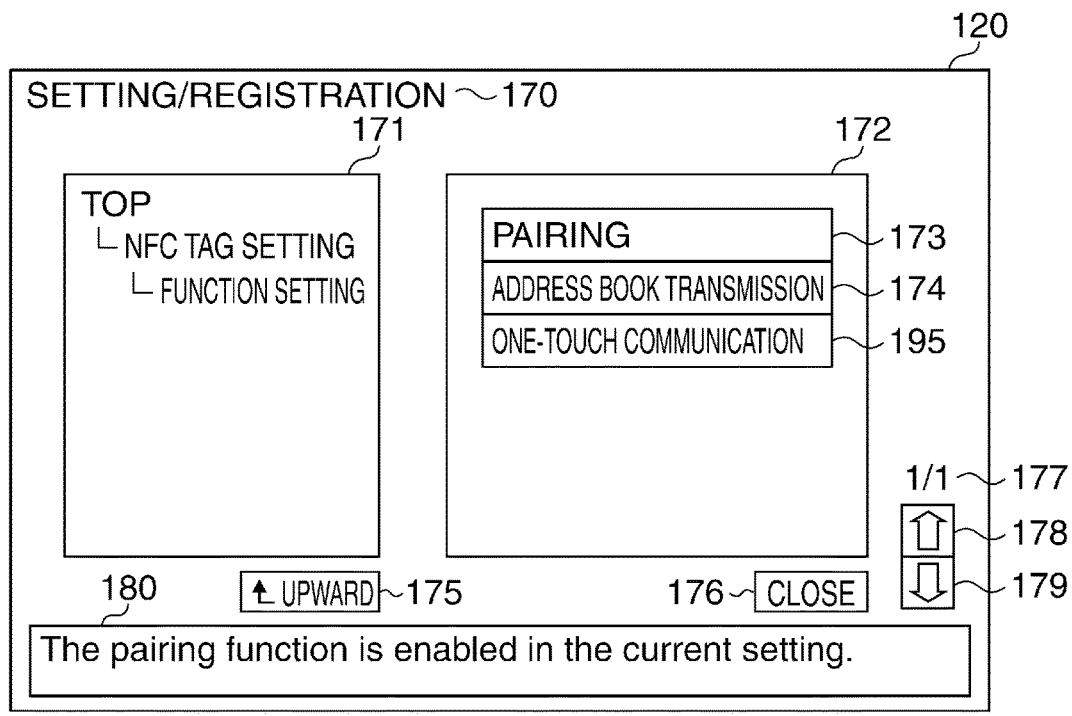
Figure 13B:
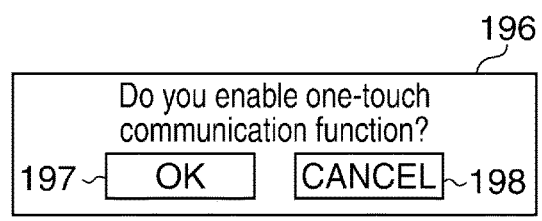

FIGS. 13A and 13B are schematic diagrams each showing a user interface screen displayed on the console section 120, for registering/changing the set value. The display of these screens is controlled by the CPU 101 based on the software stored in the ROM 103 and the HDD 104. The setting/registration menu screen shown in FIG. 13A is displayed on the console section 120 when the set/register button 158 is selected on the main menu screen shown in FIG. 9. This screen differs from the setting/registration menu screen shown in FIG. 10A only in that a one-touch communication selection button 195 is added in the detailed menu display window 172, and hence description of the same part is omitted. The one-touch communication selection button 195 is selected when performing the pairing function and the address book transmission function by a user's one-touch operation.

FIG. 13B shows a one-touch communication setting confirmation window 196 which is displayed when the one-touch communication selection button 195 is selected. When the user intends to enable the one-touch communication function setting, the user presses a setting OK button 197. Upon detection of pressing of the setting OK button 197, the CPU 101 cause the NFC tag controller 107 to perform the setting of the one-touch communication function, and updates the corresponding set value stored in the HDD 104. Then, the CPU 101 displays the setting/registration menu screen (FIG. 13A) on the console section 120. When the user intends to cancel a setting operation for the one-touch communication function, the user presses a setting cancel button 198. Upon detection of pressing of the setting cancel button 198, the CPU 101 causes the setting/registration menu screen to be displayed on the console section 120.

Figure 14:
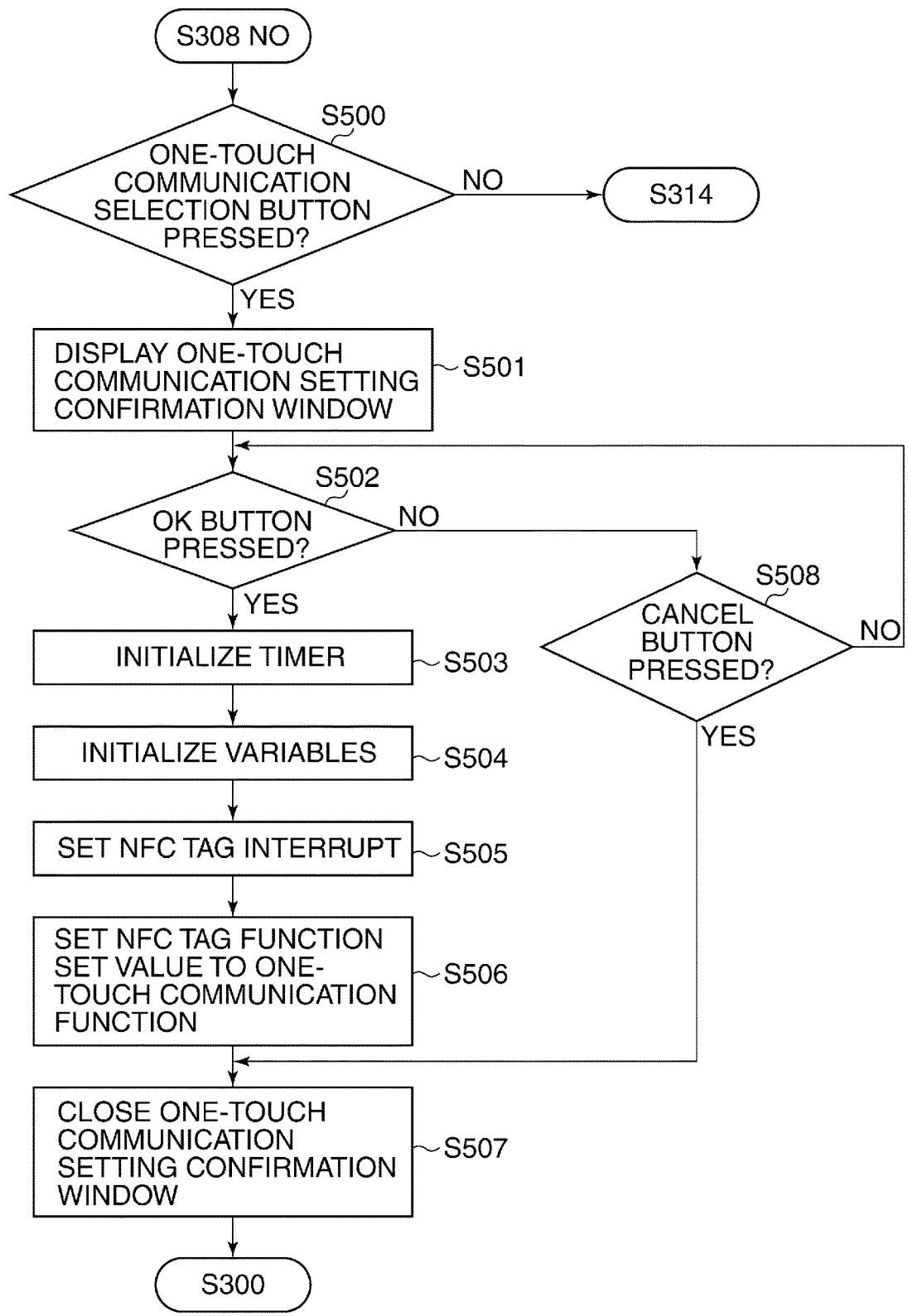
FIG. 14 is a flowchart of part of an NFC tag function-setting control process performed by the image forming apparatus.

FIG. 14 is a flowchart of part of the NFC tag function-setting control process performed by the image forming apparatus 100 as the information processing apparatus according to the third embodiment. If it is determined in the step S308 in FIG. 11B that the address book transmission selection button 174 (FIG. 13A) has not been pressed on the setting/registration menu screen, the CPU 101 proceeds to a step S500 in FIG. 14. In the step S500, the CPU 101 determines whether or not the one-touch communication selection button 195 has been pressed on the setting/registration menu screen (FIG. 13A). If it is determined in the step S500 that the one-touch communication selection button 195 has not been pressed, the CPU 101 proceeds to the step S314 in FIG. 11B, whereas if the one-touch communication selection button 195 has been pressed, the CPU 101 proceeds to a step S501.

In the step S501, the CPU 101 causes the one-touch communication setting confirmation window 196 (FIG. 13B) to be displayed. Next, the CPU 101 determines whether or not the setting OK button 197 has been pressed on the one-touch communication setting confirmation window 196 (step S502). If the setting OK button 197 has not been pressed, the CPU 101 determines whether or not the setting cancel button 198 has been pressed (step S508). The CPU 101 repeats the steps S502 and S508 until one of these buttons is pressed. When the setting OK button 197 has been pressed, the CPU 101 initializes the timer 121 (step S503). Here, the initialization of the timer 121 means clearing of the count value, setting of the timer threshold value, and enabling of the interrupt function for generating an interrupt signal in a case where the timer count value exceeds the threshold value.

Next, the CPU 101 initializes local variables concerning the NFC tag function control, which are held in the RAM 102 (step S504). The local variables are not only respective values of the above-described writing success flag and response success flag, but also a value of a timer start flag (not shown). The timer start flag is a software flag for determining whether or not the CPU 101 has instructed the timer 121 to start time counting for the one-touch communication function. Next, the CPU 101 sets, as the NFC tag interrupt setting, the NFC tag controller 107 to select the external magnetic field detection interrupt and the writing success interrupt (third interrupt setting) (step S505).

Next, the CPU 101 sets the NFC tag function set value stored in the HDD 104 to the one-touch communication function (step S506). As a result, the set value indicating that the one-touch communication function, which is not included in the second embodiment, is enabled as the operation mode, is stored. After that, the process proceeds to a step S507. Further, if it is determined in the step S508 that the setting cancel button 198 has been pressed, the process also proceeds to the step S507. In the step S507, the CPU 101 causes the one-touch communication setting confirmation window 196 to be closed, i.e. cease to be displayed. Then, the process proceeds to the step S300 in FIG. 11A.

Figure 15A:
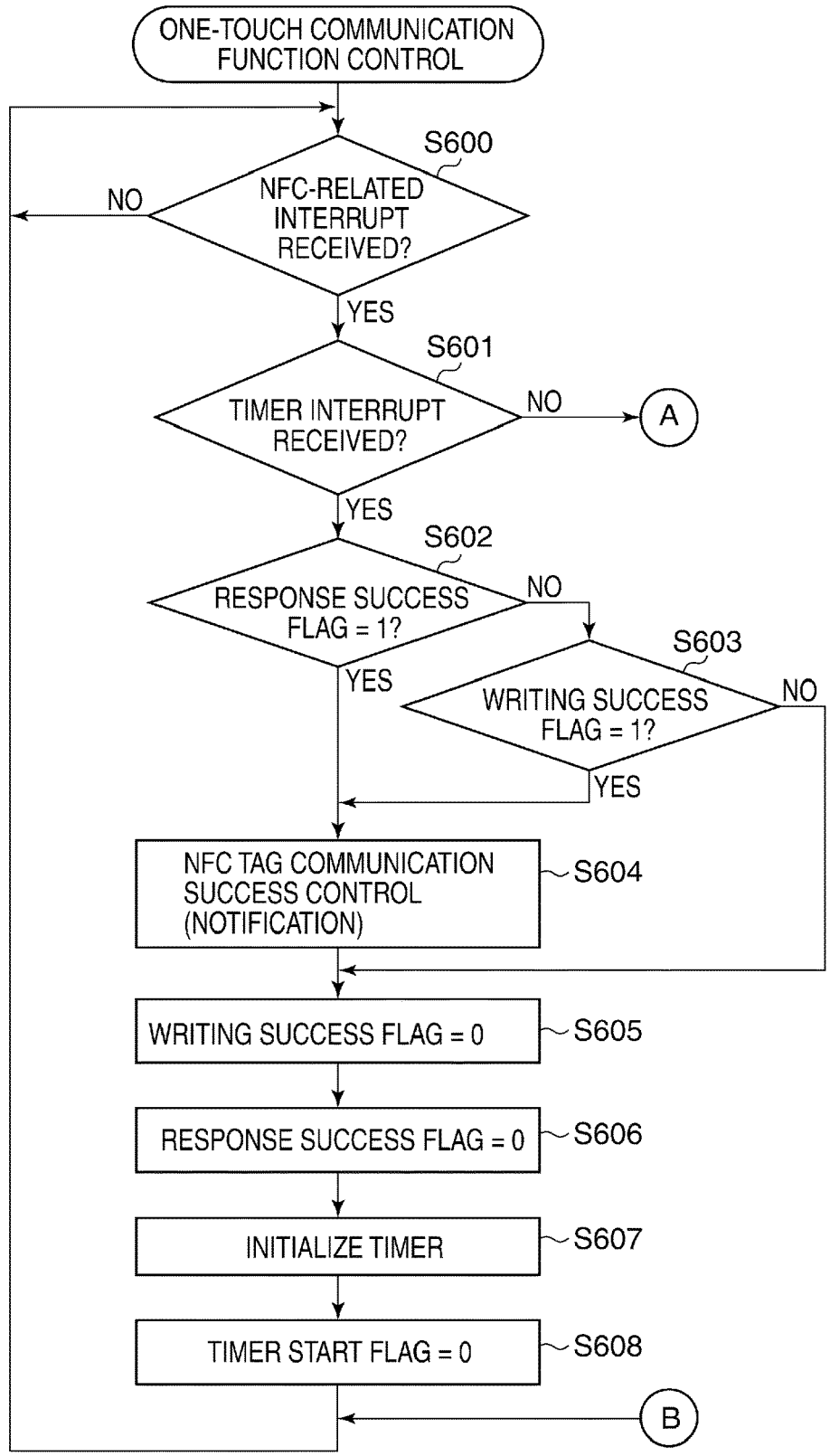
FIGS. 15A and 15B are a flowchart of a one-touch communication function control process performed by the image forming apparatus.
Figure 15B:
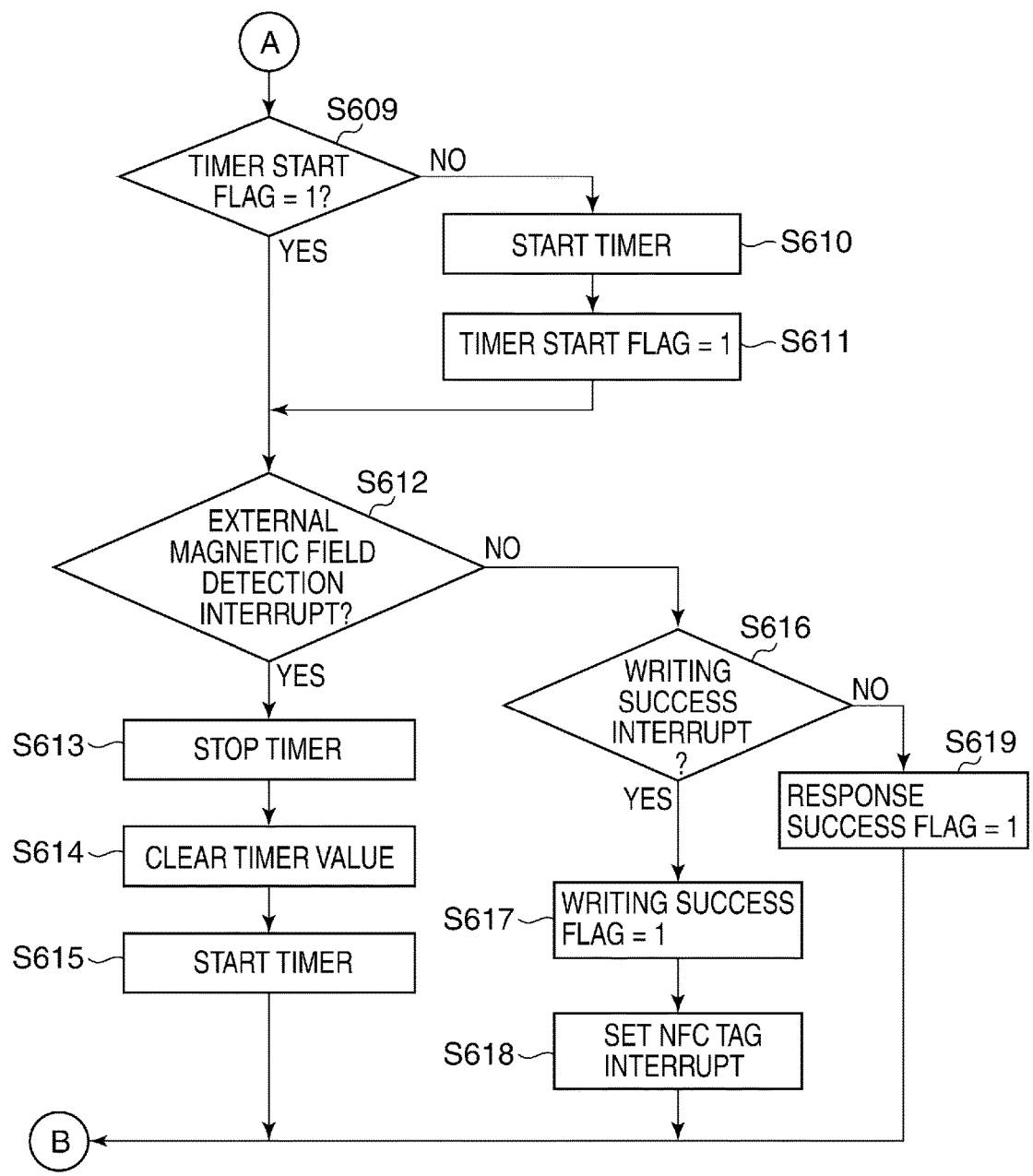

FIGS. 15A and 15B are a flowchart of a one-touch communication function control process performed by the image forming apparatus 100. This process is executed in a state where the one-touch communication function is enabled after execution of the step S506 in FIG. 14, and is controlled by the CPU 101 based on the software stored in the ROM 103 and the HDD 104.

First, the CPU 101 determines whether or not an interrupt signal concerning the one-touch communication function control, i.e. an interrupt signal generated by the NFC tag controller 107 or an interrupt signal generated by the timer 121 has been received (step S600). The CPU 101 continues to execute the step S600 until an interrupt signal is received, and when the interrupt signal has been received, the CPU 101 checks the type of the received interrupt signal, and determines whether or not the received interrupt signal is a timer interrupt signal generated by the timer 121 (step S601). The timer interrupt signal is generated when a predetermined time period defined by the threshold value has elapsed after the start of the timer.

If it is determined in the step S601 that the received interrupt signal is a timer interrupt signal, the CPU 101 determines whether or not the response success flag held in the RAM 102 is equal to 1 (step S602), and if the response success flag is equal to 1, the CPU 101 proceeds to a step S604. On the other hand, if the response success flag is not equal to 1, the CPU 101 determines whether or not the writing success flag is equal to 1 (step S603). If it is determined in the step S603 that the writing success flag is equal to 1, the CPU 101 proceeds to the step S604, whereas if the writing success flag is not equal to 1, the CPU 101 proceeds to a step S605.

In the step S604, the CPU 101 notifies the user of the success in NFC communication 700 e.g. in the same manner as in the steps S109 and S208. By performing this NFC tag communication success control, it is possible to notify the user of successful termination of the communication. In order to execute this NFC tag communication success control (step S604), the present process is required to have executed the step S617 or S619. Therefore, success in the communication is notified depending on generation of an interrupt signal by the third interrupt setting.

In the following step S605, the CPU 101 initializes the writing success flag by setting the writing success flag to 0, and in a step S606, the CPU 101 initializes the response success flag by setting the response success flag to 0. Next, as initialization of the timer 121, the CPU 101 clears the count value, sets the timer threshold value, and enables the interrupt function for generating an interrupt signal in the case where the count value exceeds the threshold value (step S607). Then, the CPU 101 initializes the timer start flag by setting the timer start flag to 0 (step S608), and then the process returns to the step S600.

If it is determined in the step S601 that the received interrupt signal is not a timer interrupt signal, the received interrupt signal is an interrupt signal generated by the NFC tag controller 107, and hence the CPU 101 determines whether or not the timer start flag is equal to 1 (step S609). If it is determined in the step S609 that the timer start flag is not equal to 1, the CPU 101 causes, via the system bus 114, the timer 121 to start time counting (step S610), and sets the timer start flag to 1 (step S611). Then, the process proceeds to a step S612. On the other hand, if the timer start flag is equal to 1, the process also proceeds to the step S612.

In the step S612, the CPU 101 checks the type of the received interrupt signal generated by the NFC tag controller 107, and determines whether or not the type of the interrupt signal is the external magnetic field detection interrupt. If it is determined in the step S612 that the type of the interrupt signal is the external magnetic field detection interrupt, the CPU 101 stops the timer 121 via the system bus 114 (step S613). Next, the CPU 101 clears the count value of the timer 121 (step S614), and starts time counting by the timer 121 again (step S615). Then, the process returns to the step S600.

On the other hand, if the type of the interrupt signal is not the external magnetic field detection interrupt, the CPU 101 determines whether or not the type of the interrupt signal is the writing success interrupt (step S616). If it is determined in the step S616 that the type of the interrupt signal is the writing success interrupt, the CPU 101 sets the writing success flag to 1 (step S617). Then, the CPU 101 sets the NFC tag controller 107 to select the external magnetic field detection interrupt and the response success interrupt, as the NFC tag interrupt setting (step S618). Then, the process returns to the step S600. On the other hand, if the type of the interrupt signal is not the writing success interrupt, the type of the interrupt signal is the response success interrupt, and hence the CPU 101 sets the response success flag to 1 (step S619), and returns to the step S600.

Figure 16:
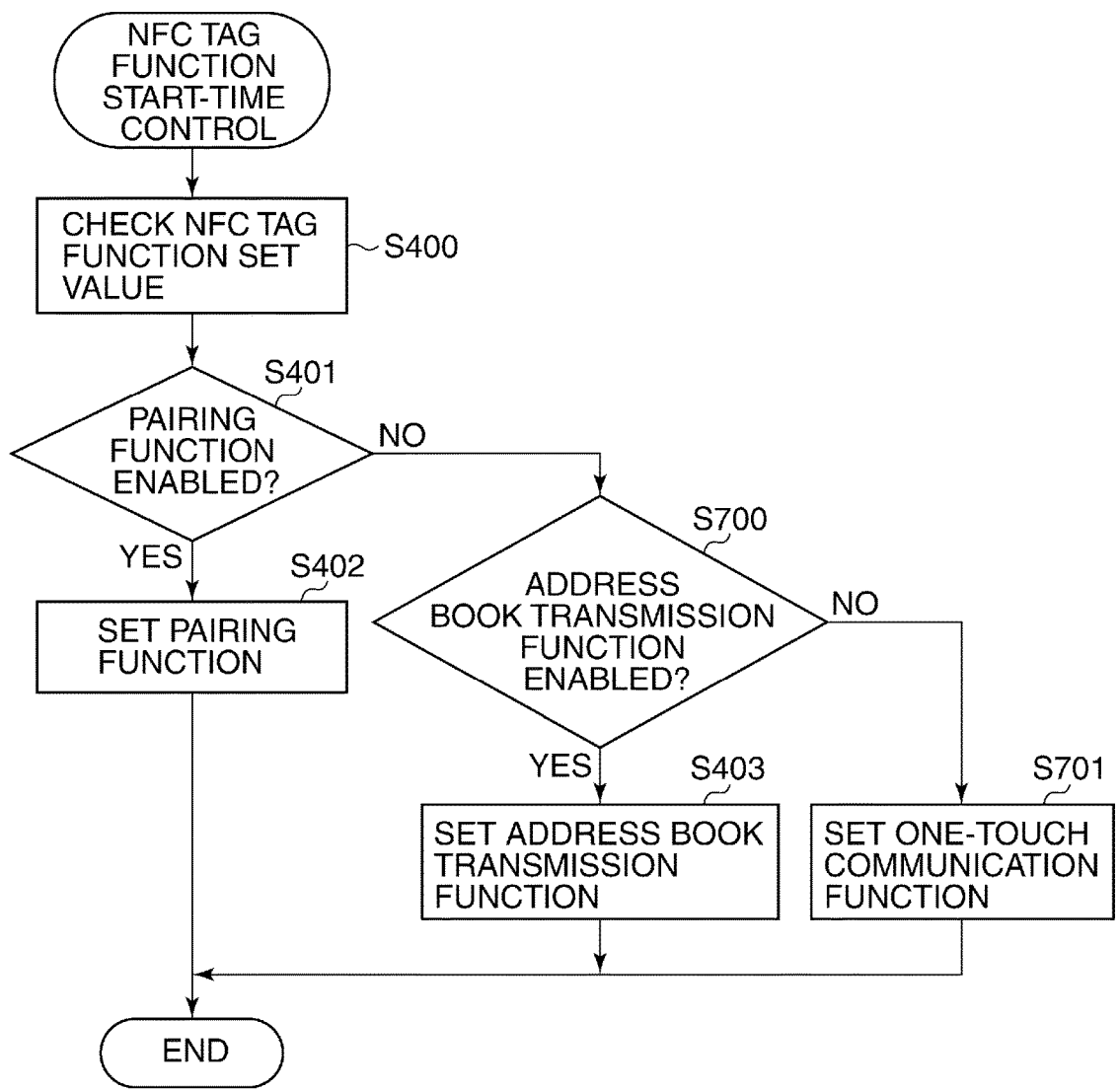
FIG. 16 is a flowchart of an NFC tag function start-time control process performed by the image forming apparatus.

FIG. 16 is a flowchart of an NFC tag function start-time control process performed by the image forming apparatus 100. This NFC tag function start-time control process is controlled, as part of the startup process which is started when the image forming apparatus 100 is powered on, by the CPU 101 based on the software stored in the ROM 103 and the HDD 104. This flowchart is formed by adding steps S700 and S701 to the flowchart in FIG. 12.

First, the steps S400 to S402 are the same as those described with reference to FIG. 12. If it is determined in the step S401 that a set value indicating that the pairing function is enabled is not stored as the NFC tag function set value, the CPU 101 proceeds to the step S700. In the step S700, the CPU 101 determines whether or not a set value indicating that the address book transmission function is enabled is stored as the NFC tag function set value. If it is determined in the step S700 that the set value indicating that the address book transmission function is enabled is stored as the NFC tag function set value, the CPU 101 executes the step S403, similarly to the step S403 in FIG. 12. On the other hand, if the set value indicating that the address book transmission function is enabled is not stored as the NFC tag function set value, the set value indicating that the one-touch communication function is enabled is stored as the NFC tag function set value, and hence the CPU 101 proceeds to the step S701. In the step S701, the CPU 101 causes the NFC tag controller 107 to perform the setting of the one-touch communication function. The setting of the one-touch communication function refers to initialization of the local variables, initialization of the timer, and the NFC tag interrupt setting, but is not limited to these.

Similar to FIG. 12, after execution of the step S402, the steps S102 to S109 in FIG. 7, concerning the pairing function control processing, are executed. Similar to FIG. 12, after execution of the step S403, the steps S201 to S209 in FIG. 8, concerning the address book transmission function control processing, are executed. Further, after execution of the step S701, the step S600 et seq. in FIGS. 15A and 15B are executed.

According to the present embodiment, the functions which can be set for the operation mode include not only the pairing function and the address book transmission function in the second embodiment, but also the one-touch communication function. Further, the interrupt settings which can be selected for a set operation mode include not only the first interrupt setting and the second interrupt setting, but also the third interrupt setting. Therefore, it is possible not only to obtain the same advantageous effects as provided by the second embodiment, but also to perform the pairing function and the address book transmission function, by a user's one-touch operation for causing the mobile terminal 300 to move closer to the image forming apparatus 100 once, which improves the user-friendliness.

In the second and third embodiments, the pairing function, the address book transmission function, and the one-touch communication function have been described, as the function settings which can be set as the NFC tag function set values, by way of example. However, this is not limitative, but any other NFC tag function or a function of disabling the NFC communication 700 may be set as the NFC tag function set value.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-068492 filed Mar. 30, 2015, which is hereby incorporated by reference herein in its entirety.

What is claimed is:

1. An information processing apparatus including a near-field wireless communication tag, comprising:
at least one memory configured to store instructions; and
at least one processor connected to the at least one memory and configured to execute the instructions to:
display a selection screen including an address book transmission function, in which an external apparatus writes address book data into the near-field wireless communication tag, and a pairing function, in which the external apparatus reads connecting information held by the near-field wireless communication tag, as a function associated with use of the near-field wireless communication tag by an authenticated user;
receive an instruction from the authenticated user, the instruction specifying a selection of one of the address book transmission function, in which the external apparatus writes address book data into the near-field wireless communication tag, or the pairing function, in which the external apparatus reads connecting information held by the near-field wireless communication tag, as the function associated with use of the near-field wireless communication tag by the authenticated user;
select, based on the received instruction from the authenticated user, one of the address book transmission function, in which the external apparatus writes address book data into the near-field wireless communication tag, or the pairing function, in which the external apparatus reads connecting information held by the near-field wireless communication tag, as the function associated with use of the near-field wireless communication tag by the authenticated user;
in a case where the address book transmission function is selected, set the near-field wireless communication tag to an address book transmission function setting mode configured to cause a first interrupt signal to be generated when address book data is written into the near-field wireless communication tag by the external apparatus, the first interrupt signal causing the information processing apparatus to notify the authenticated user of successful completion of the address book transmission function; and in a case where the pairing function is selected, set the near-field wireless communication tag to a pairing function setting mode configured to cause a second interrupt signal to be generated when connecting information held by the near-field wireless communication tag is read by the external apparatus, the second interrupt signal causing the information processing apparatus to notify the authenticated user of successful completion of the pairing function.

2. The information processing apparatus according to claim 1, wherein the processor is configured to execute further instructions to identify the selected function when the information processing apparatus is started up, wherein, in a case where the identified function is the address book transmission function, the near-field wireless communication tag is set to the address book transmission function setting mode, and wherein, in a case where the identified function the pairing function, the near-field wireless communication tag is set to the pairing function setting mode.

3. The information processing apparatus according to claim 1, wherein the processor is configured to execute further instructions to notify the user of success in communication via the near-field wireless communication tag in a case where an interrupt signal is received from the near-field wireless communication tag.

4. The information processing apparatus according to claim 3, further comprising a display, wherein, in a case where the interrupt signal is received from the near-field wireless communication tag, a success notification in communication via the near-field wireless communication tag is displayed on the display.

5. The information processing apparatus according to claim 3, further comprising an LED, wherein, in a case where the interrupt signal is received from the near-field wireless communication tag, the user is notified of success in communication via the near-field wireless communication tag by lighting the LED.

6. The information processing apparatus according to claim 3, further comprising a loudspeaker, wherein, in a case where the interrupt signal is received from the near-field wireless communication tag, the user is notified of success in communication via the near-field wireless communication tag by causing sound to be output from the loudspeaker.

7. The information processing apparatus according to claim 1, wherein, in a case where the pairing function is selected, the near-field wireless communication tag is configured to hold the address of the information processing apparatus.

8. The information processing apparatus according to claim 1, wherein the information processing apparatus is a printing apparatus that performs print processing.

9. A method of controlling an information processing apparatus including a near-field wireless communication tag, comprising:

displaying a selection screen including an address book transmission function, in which an external apparatus writes address book data into the near-field wireless communication tag, and a pairing function, in which the external apparatus reads connecting information held by the near-field wireless communication tag, as a function associated with use of the near-field wireless communication tag by an authenticated user;

receiving an instruction from the authenticated user, the instruction specifying a selection of one of the address book transmission function, in which the external apparatus writes address book data into the near-field wireless communication tag, or the pairing function, in which the external apparatus reads connecting information held by the near-field wireless communication tag, as the function associated with use of the near-field wireless communication tag by the authenticated user;

selecting, based on the received instruction from the authenticated user, one of the address book transmission function, in which the external apparatus writes address book data into the near-field wireless communication tag, or the pairing function, in which the external apparatus reads connecting information held by the near-field wireless communication tag, as the function associated with use of the near-field wireless communication tag by the authenticated user;

in a case where the address book transmission function is selected, setting the near-field wireless communication tag to an address book transmission function setting mode configured to cause a first interrupt signal to be generated when address book data is written into the near-field wireless communication tag by the external apparatus, the first interrupt signal causing the information processing apparatus to notify the authenticated user of successful completion of the address book transmission function; and in a case where the pairing function is selected, set the near-field wireless communication tag to a pairing function setting mode configured to cause a second interrupt signal to be generated when connecting information held by the near-field wireless communication tag is read by the external apparatus, the second interrupt signal causing the information processing apparatus to notify the authenticated user of successful completion of the pairing function.

10. A non-transitory computer-readable storage medium storing a computer-executable program for executing a method of controlling an information processing apparatus including a near-field wireless communication tag, wherein the method comprises:

displaying a selection screen including an address book transmission function, in which an external apparatus writes address book data into the near-field wireless communication tag, and a pairing function, in which the external apparatus reads connecting information held by the near-field wireless communication tag, as a function associated with use of the near-field wireless communication tag by an authenticated user;

receiving an instruction from the authenticated user, the instruction specifying a selection of one of the address book transmission function, in which the external apparatus writes address book data into the near-field wireless communication tag, or the pairing function, in which the external apparatus reads connecting information held by the near-field wireless communication tag, as the function associated with use of the near-field wireless communication tag by the authenticated user;

selecting, based on the received instruction from the authenticated user, one of the address book transmission function, in which the external apparatus writes address book data into the near-field communication tag, or the pairing function, in which the external apparatus reads connecting information held by the near-field wireless communication tag, as the function associated with use of the near-field wireless communication tag by the authenticated user;

in a case where the address book transmission function is selected, setting the near-field wireless communication tag to an address book transmission function setting mode configured to cause a first interrupt signal to be generated when address book data is written into the near-field wireless communication tag by the external apparatus, the first interrupt signal causing the information processing apparatus to notify the authenticated user of successful completion of the address book transmission function; and in a case where the pairing function is selected, set the near-field wireless communication tag to a pairing function setting mode configured to cause a second interrupt signal to be generated when connecting information held by the near-field wireless communication tag is read by the external apparatus, the second interrupt signal causing the information processing apparatus to notify the authenticated user of successful completion of the pairing function.

* * * * *